United States Patent
Paul et al.

(10) Patent No.: US 12,480,288 B2
(45) Date of Patent: Nov. 25, 2025

(54) HANDLING SYSTEM FOR GROUND-ENGAGING WEAR PARTS SECURED TO EARTH WORKING EQUIPMENT

(71) Applicant: ESCO GROUP LLC, Portland, OR (US)

(72) Inventors: David M. Paul, Magdalena, NM (US); Rodney K. Clarke, Cleveland (AU); Alain Latino, Ardoss (AU)

(73) Assignee: ESCO GROUP LLC, Portland, OR (US)

( * ) Notice: Subject to any disclaimer, the term of this patent is extended or adjusted under 35 U.S.C. 154(b) by 0 days.

(21) Appl. No.: 18/242,755

(22) Filed: Sep. 6, 2023

(65) Prior Publication Data
US 2024/0076858 A1 Mar. 7, 2024

Related U.S. Application Data

(60) Provisional application No. 63/404,488, filed on Sep. 7, 2022.

(51) Int. Cl.
*E02F 9/28* (2006.01)

(52) U.S. Cl.
CPC .......... *E02F 9/2891* (2013.01); *E02F 9/2825* (2013.01); *E02F 9/2833* (2013.01)

(58) Field of Classification Search
CPC .... E02F 9/2891; B25J 15/106; B25J 15/0033; B25B 1/2415
See application file for complete search history.

(56) References Cited

U.S. PATENT DOCUMENTS

| | | | | |
|---|---|---|---|---|
| 4,199,972 A | * | 4/1980 | Wiener | B25B 7/00 81/419 |
| 4,572,564 A | * | 2/1986 | Cipolla | B25J 15/106 294/902 |
| 5,011,207 A | * | 4/1991 | Stevens | B25J 15/106 901/39 |
| 5,403,057 A | * | 4/1995 | Sugito | B25B 1/2421 294/902 |
| 5,407,185 A | * | 4/1995 | Zehnpfennig | B25B 1/2421 269/266 |
| 5,588,688 A | * | 12/1996 | Jacobsen | B25J 15/0266 294/902 |

(Continued)

FOREIGN PATENT DOCUMENTS

| | | | |
|---|---|---|---|
| CN | 113601539 A | * 11/2021 | |
| DE | 202014102617 U1 | * 8/2014 | B25J 15/0038 |

OTHER PUBLICATIONS

CN-113601539-A translation (Year: 2021).*
DE-202014102617-U1 translation (Year: 2014).*

*Primary Examiner* — Michael W Hotchkiss
(74) *Attorney, Agent, or Firm* — Steven Schad; Palmer Dzurella

(57) ABSTRACT

A handling system for handling ground-engaging wear parts used on earth working equipment includes handling tools to remove and handle wear parts from equipment and/or to install new wear parts. The tools can include a gripping system to engage and disengage a wear part for installation and removal. The gripping system allows an operator to more easily grip a wear part and allows for various shapes and sizes of wear parts.

16 Claims, 15 Drawing Sheets

(56) References Cited

U.S. PATENT DOCUMENTS

| | | | | |
|---|---|---|---|---|
| 6,953,188 B2* | 10/2005 | Siegel | ................... | B25B 1/2421 |
| | | | | 269/254 CS |
| 8,025,323 B2* | 9/2011 | Ransom | ............... | B25J 19/0091 |
| | | | | 901/45 |
| 8,172,292 B1* | 5/2012 | Andersen | ............. | B65B 25/046 |
| | | | | 294/2 |
| 8,376,433 B2* | 2/2013 | Wegener | ................... | B66C 1/28 |
| | | | | 294/902 |
| 8,485,576 B2* | 7/2013 | Melville | ............. | B25J 15/0608 |
| | | | | 294/213 |
| 8,534,728 B1* | 9/2013 | Bosscher | ............... | B25J 15/106 |
| | | | | 294/902 |
| 9,222,243 B2 | 12/2015 | Cheyne et al. | | |
| 9,272,422 B2* | 3/2016 | Matsuoka | ............ | B25J 15/0028 |
| 9,505,135 B1* | 11/2016 | Malstrom | ............ | B25J 15/0042 |
| 9,718,194 B2* | 8/2017 | Ekas | ................... | B25J 15/0009 |
| 9,925,672 B2* | 3/2018 | Nakayama | ............. | B25J 19/022 |
| 10,065,309 B2* | 9/2018 | Rose | ........................ | B25J 15/10 |
| 10,800,045 B1* | 10/2020 | Jonas | ................... | B25J 17/0208 |
| 11,549,242 B2* | 1/2023 | Saunders | ................. | B25J 5/007 |
| 2009/0314112 A1* | 12/2009 | Melville | ................ | B25J 15/106 |
| | | | | 74/144 |
| 2012/0222335 A1* | 9/2012 | Charlton | ............... | E02F 9/2891 |
| | | | | 29/253 |
| 2015/0107075 A1* | 4/2015 | Clarke | ..................... | B25J 11/00 |
| | | | | 29/703 |
| 2015/0190929 A1 | 7/2015 | Matsuoka | | |
| 2016/0221157 A1* | 8/2016 | Brucker | ................... | B25B 5/14 |
| 2016/0375589 A1* | 12/2016 | Ekas | ....................... | B25J 15/10 |
| | | | | 294/106 |
| 2017/0356167 A1* | 12/2017 | Paul | ....................... | B25J 11/005 |
| 2019/0285151 A1* | 9/2019 | Paul | ........................ | F16H 29/12 |
| 2019/0360180 A1* | 11/2019 | Carpenter | ............ | B25J 13/006 |
| 2020/0263396 A1* | 8/2020 | Clarke | ................. | B25J 17/0208 |
| 2021/0291384 A1* | 9/2021 | Chintalapalli Patta | ..................... | |
| | | | | B25J 15/106 |
| 2022/0403630 A1 | 12/2022 | Nienaber et al. | | |
| 2023/0076756 A1 | 3/2023 | Stilson et al. | | |
| 2023/0234244 A1 | 7/2023 | Raj | | |
| 2023/0241785 A1* | 8/2023 | Harrigan | ................ | B25J 9/1653 |
| | | | | 700/245 |

* cited by examiner

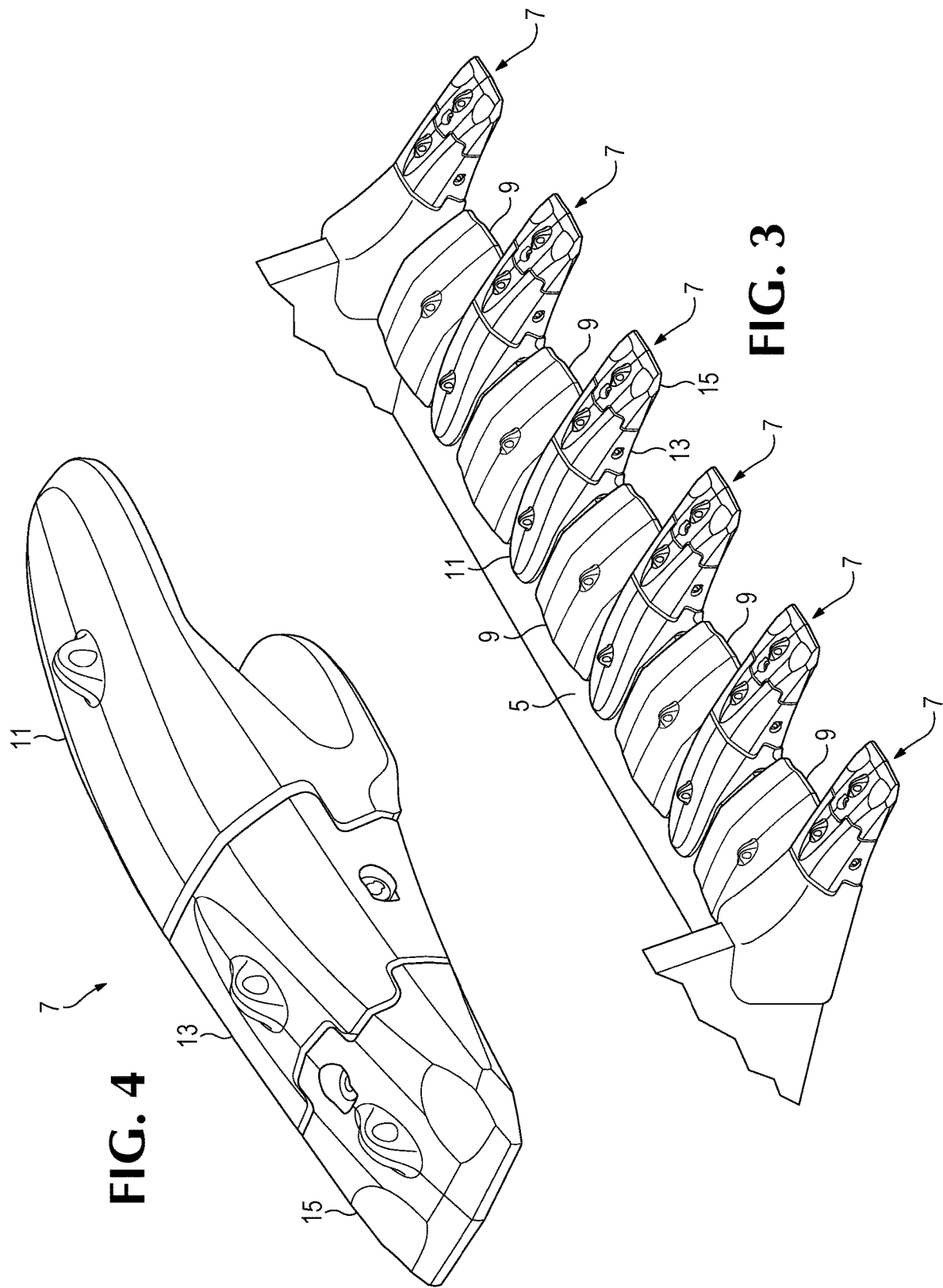

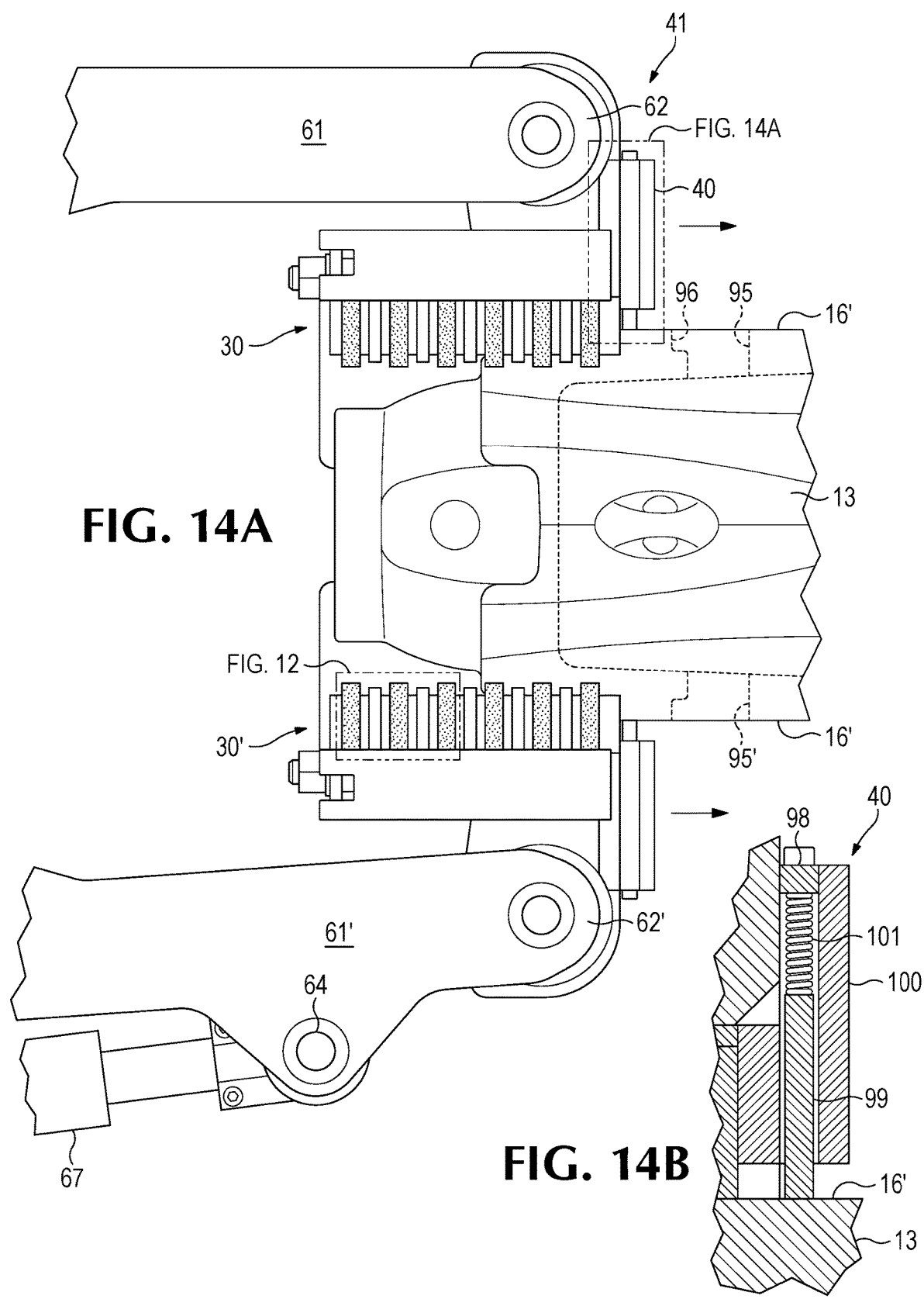

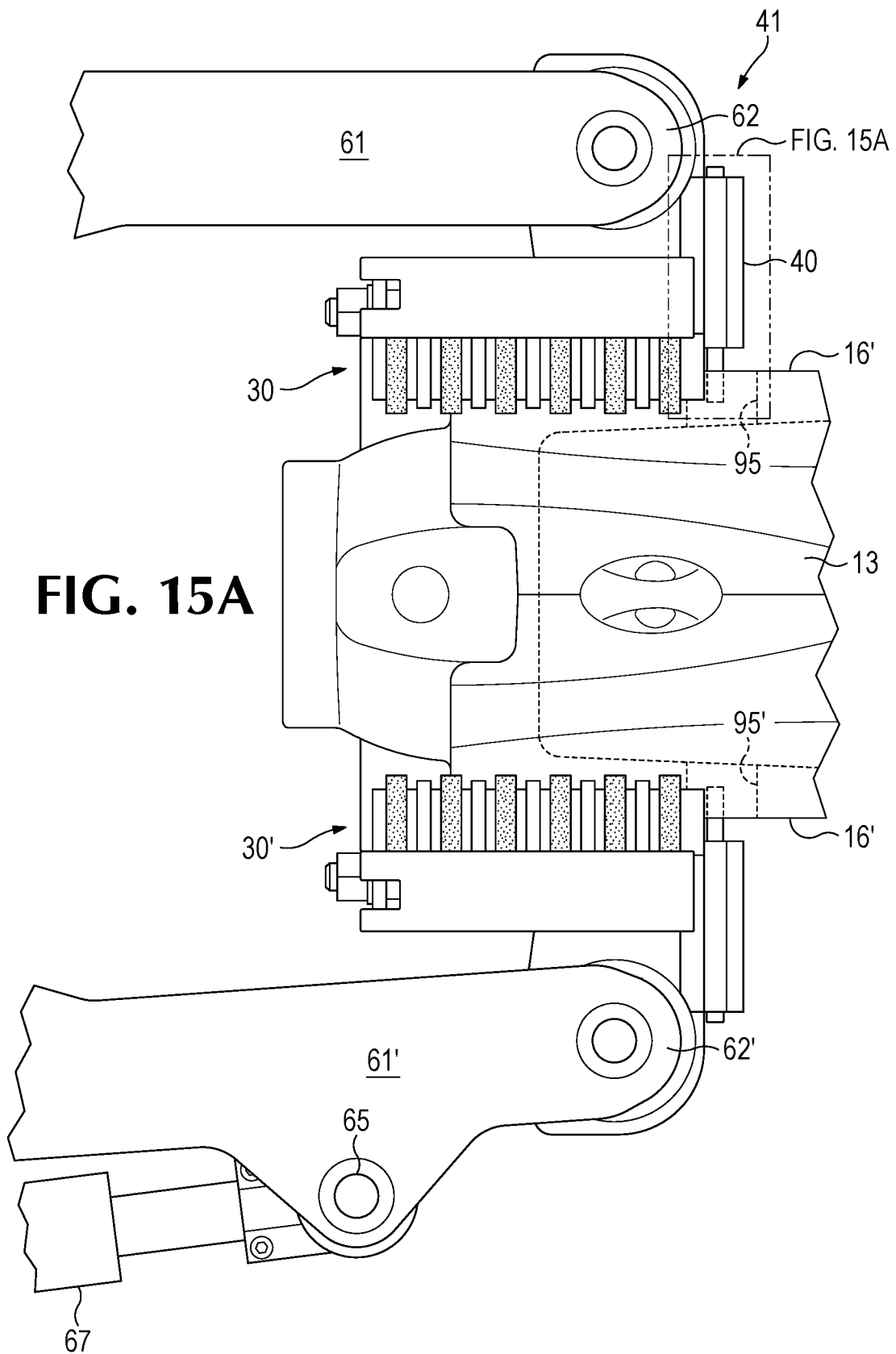

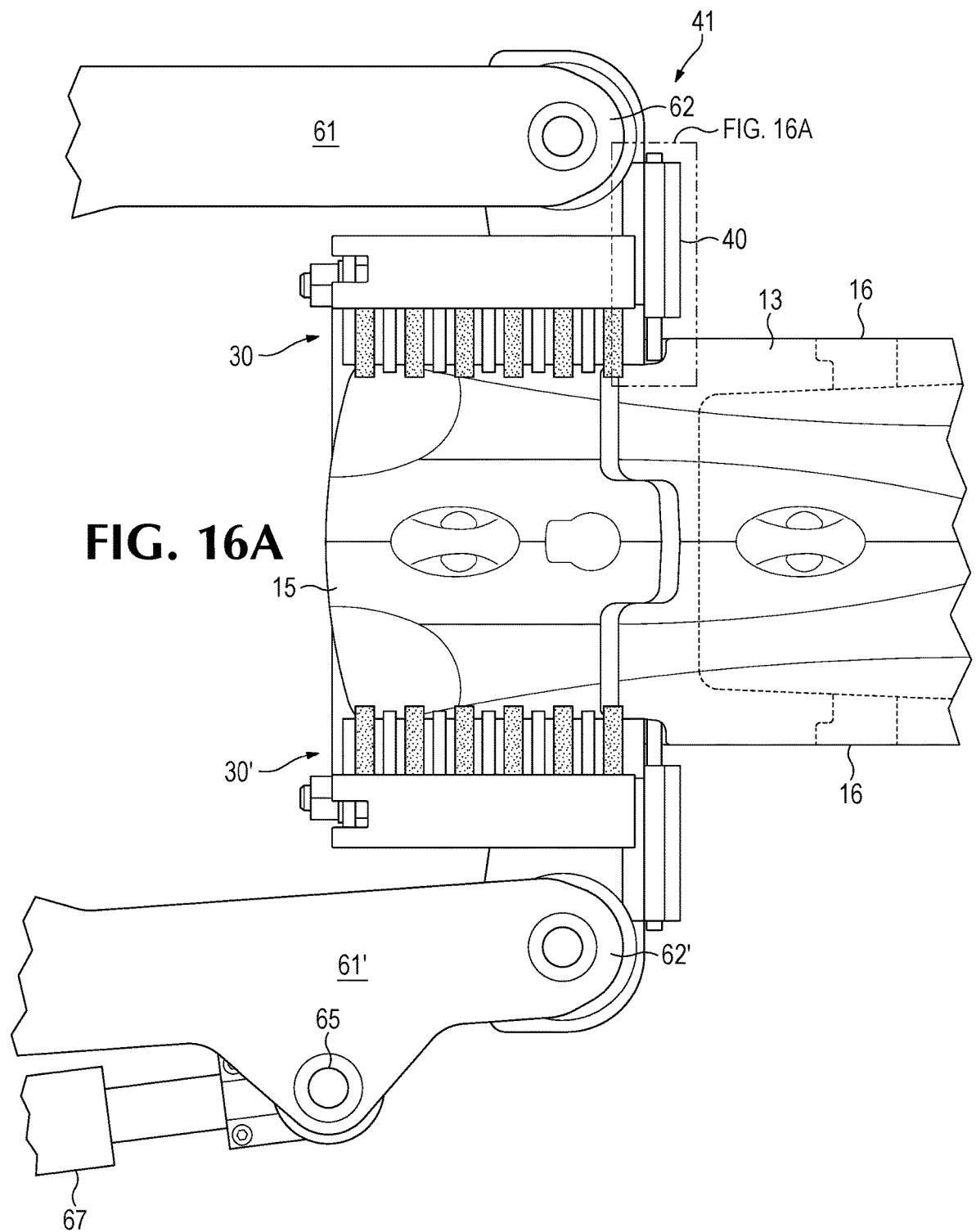

HANDLING SYSTEM FOR GROUND-ENGAGING WEAR PARTS SECURED TO EARTH WORKING EQUIPMENT

RELATED APPLICATIONS

This application claims priority to U.S. Provisional Patent Application No. 63/404,488 filed Sep. 7, 2022 entitled "Handling System for Ground-Engaging Wear Parts Secured to Earth Working Equipment," which is incorporated by reference in its entirety herein and made a part hereof.

FIELD OF THE INVENTION

This disclosure pertains to a handling system for handling ground-engaging wear parts such as ground engaging tools (GET) secured to earth working equipment, and to processes for removing and installing such wear parts. In particular, the disclosure pertains to a gripping system for handling the ground-engaging wear parts.

BACKGROUND OF THE INVENTION

In mining and construction, ground-engaging wear parts (e.g., tips and shrouds) are commonly provided along the digging edge of earth working equipment such as buckets for dragline machines, cable shovels, face shovels, hydraulic excavators, loaders, bucket wheel excavators, and the like. These wear parts protect the underlying equipment from undue wear and, in some cases, perform other functions such as breaking up the ground ahead of the digging edge. During use, these wear parts can encounter heavy loading and highly abrasive conditions. As a result, they must be periodically replaced.

These wear parts are commonly mounted on a base that is secured to the earth working equipment (e.g., along the digging edge), with the wear part secured to the base to engage the ground. The wear part tends to wear out more quickly and is typically replaced a number of times before the base (which can sometimes also be considered a replaceable wear part) must also be repaired or replaced. One example of such a wear part is an excavating tooth that is attached to the lip of a bucket for an earth working machine. A tooth typically includes an adapter secured to the lip of a bucket as the base, and a tip or point attached to the adapter to initiate contact with the ground. In those examples with a tip, a tooth may include an adapter, and intermediate adapter, and the tip. A pin or other kind of retaining lock is used to secure the point to the adapter, tip to intermediate adapter, intermediate adapter to adapter, and the like.

There are a number of challenges and hazards associated with the removal and installation of ground-engaging wear parts for earth working equipment. The wear parts can be large, heavy and/or unwieldy leading to difficulty and/or hazards in lifting, holding and/or manipulating the wear part during removal and installation. Worn parts can also be non-uniform from each other, even if the same manufacturer. Maintenance of wear parts requires support equipment of heavy tools and transport which can pose risk of injury especially when used in adverse conditions (e.g., extreme heat or cold, rain, snow, sleet, darkness, etc.). These risks can be exacerbated on account of lifting features such as lifting eyes being worn away, complex geometries of the parts, space constraints, orientation of parts, complicated or unstable rigging for securing the parts to a hoist, heavy and cumbersome protective clothing and gloves worn by workers, impacted earthen fines, hammers needed for removal and installation, etc.

SUMMARY OF THE INVENTION

This disclosure pertains to a handling system for handling ground-engaging wear parts used with earth working equipment (e.g., excavating equipment). The handling system can facilitate an easy, quick, and/or safe removal and/or installation of ground-engaging wear parts, and/or other handling of the wear parts.

In one example, a handling tool for gripping a ground-engaging wear part for earth working equipment to facilitate the handling of the wear part includes a pair of gripping assemblies. The gripping assemblies are spaced apart to receive the wear part therebetween. Each of the gripping assemblies includes an inner surface to contact and hold the wear part. A tab that is resiliently biased projects inward of the inner surface. The tab is retractable against the resilient bias when in contact with an outer surface of the wear part and extendible for contact with a rear-facing surface on the wear part. Actuators move the gripping assemblies toward and apart from each other to grip and release the wear part. A base structure supports the gripping assemblies and the actuators.

In another example, a handling tool for gripping a ground-engaging wear part for earth working equipment includes a pair of gripping assemblies spaced apart to receive the wear part therebetween. Each of the gripping assemblies includes a plurality of resilient gripping pads and a plurality of rigid gripping elements that collectively define an inner surface to contact and hold the wear part. Actuators move the gripping assemblies toward and apart from each other to grip and release the wear part. A base structure supports the gripping assemblies and the actuators.

In one other example, a handling system includes a handling tool for gripping a ground-engaging wear part for earth working equipment to facilitate the handling of the wear part that includes a pair of gripping assemblies. The gripping assemblies are spaced apart to receive the wear part therebetween. Each of the gripping assemblies includes an inner surface to contact and hold the wear part. A tab that is resiliently biased projects inward of the inner surface. The tab is retractable against the resilient bias when in contact with an outer surface of the wear part and extendible for contact with a rear-facing surface on the wear part. Actuators move the gripping assemblies toward and away from each other to grip and release the wear part. A base structure supports the gripping assemblies and the actuators. A manipulator supports and moves the handling tool.

In another example, a handling system includes a handling tool for gripping a ground-engaging wear part for earth working equipment. The handling tool includes a pair of gripping assemblies spaced apart to receive the wear part therebetween. Each of the gripping assemblies includes a plurality of resilient gripping pads and a plurality of rigid gripping elements that collectively define an inner surface to contact the wear part. Actuators move the gripping assemblies toward and away from each other to grip and release the wear part. A base structure supports the gripping assemblies and the actuators. A manipulator supports and moves the handling tool.

In a further example, a handling tool for ground-engaging wear parts for earth working equipment includes a pair of movable arms each with a gripping assembly to grip and release the wear part. Each gripping assembly includes a housing containing a plurality of gripping pads and gripping elements arranged adjacent one another, and a tab. The plurality of gripping pads are crescent shaped to engage at least a side of the wear part. The tab can be retracted against the bias of a resilient member and extended under the pressure of the resilient member movement into a hole or adjacent a rear surface of the wear part.

In another example, a handling tool includes gripping assemblies that each include a plurality of resilient members and a plurality of rigid members bound together and interleaved with each other to collectively define an inner surface to contact a wear part for removal from and/or installation from onto earth working equipment.

In another example, a handling tool includes gripper assemblies to hold a wear part for earth working equipment. The gripper assemblies each include an inner surface to contact a side of the wear part and a biased tab to contact a rear of the wear part, wherein the biased tab is movable between retracted and extended positions.

In one other example, a handling system for ground-engaging wear parts for earth working equipment includes a manipulator, a controller, and a handling tool with a pair of movable arms to grip and release the wear part, with the movable arms each including a gripping assembly. The gripping assembly includes a biased tab extending inward from a body of the gripping assembly. The gripping assembly engages the wear part, and adjusts forward or rearward until the tab springs into a position that engages a hole or other surface of the wear part. A manipulator moves the handling tool to install and/or remove the wear part onto or from the earth working equipment. A controller controls the movements of the handling tool and the manipulator.

In another example, a handling system for ground-engaging wear parts for earth working equipment includes a manipulator, a controller, and a handling tool with a pair of movable arms to grip and release the wear part, with the movable arms each including a gripping assembly. The gripping assembly includes a biased tab. The gripping assembly engages the wear part, and adjusts forward or rearward until the tab springs into a hole of the wear part. A manipulator moves the handling tool to install and/or remove the wear part onto or from the earth working equipment. A controller controls the movements of the handling tool and the manipulator.

In a further example, a handling system for ground-engaging wear parts for earth working equipment includes a manipulator, a controller, and a handling tool with a pair of movable arms to grip and release the wear part, with the movable arms each including a gripping assembly. The gripping assembly includes a housing containing a plurality of gripping pads and gripping elements arranged adjacent one another and extending inward from the housing of the gripping assembly. A manipulator moves the handling tool to install and/or remove the wear part onto or from the earth working equipment. A controller controls the movements of the handling tool and the manipulator.

In another example, a handling system for ground-engaging wear parts for earth working equipment includes a manipulator, a controller, and a handling tool with a pair of movable arms to grip and release the wear part, with the movable arms each including a gripping assembly. The gripping assembly includes a housing having a plurality of gripping pads and gripping elements arranged adjacent one another, and a biased tab. The plurality of gripping pads engages the wear part, and adjusts forward or rearward until the tab springs into a hole of the wear part. A manipulator moves the handling tool to install and/or remove the wear part onto or from the earth working equipment. A controller controls the movements of the handling tool and the manipulator.

In another example, a gripping assembly for use in gripping a wear part for earth working equipment to facilitate handling of the wear part includes an inner surface to contact the wear part, and a tab that is resiliently biased to project inward of the inner surface and retractable against the resilient bias when in contact with a portion of the wear part.

In another example, a gripping assembly for use in gripping a wear part for earth working equipment for handling of the wear part includes a plurality of resilient gripping pads and a plurality of rigid gripping elements interleaved with each other to collectively define an inner surface to contact and hold the wear part.

In another example, a gripping assembly for a handling tool includes a plurality of resilient members arranged seriatim and separated by a plurality of rigid members, wherein the resilient members and rigid members each have an exposed inner surface for contacting and holding a wear part. Optionally, the resilient members have a greater inward extension relative to the rigid members.

In another example, a method of removing a ground-engaging wear part from earth working equipment includes moving a pair of spaced gripping assemblies laterally toward each other until they contact the wear part, moving the gripping assemblies contacting the wear part to translate along the sides of the wear part until at least one resiliently-biased tab is received adjacent a rearward-facing surface, and pulling the wear part from the earth working equipment.

In another example, a method of removing a ground-engaging wear part mounted on a base includes operating a manipulator having a handling tool so the handling tool is proximate the wear part, operating the handling tool having gripping arms having a plurality of gripping pads and gripping elements and a biased tab, such that the plurality of gripping pads and elements grip the wear part and the tab is positioned before or after a hole. The tab includes a resilient member that is compressed by retraction of the tab when the plurality of gripping pads and gripping elements grip at least sides of the wear part, and expanded to extend the tab when the handling tool is maneuvered such that the tab is positioned into the hole, operating the manipulator to pull the handling tool with the wear part from the base.

In another example, a method of removing a ground-engaging wear part mounted on a base includes operating a manipulator having a handling tool so the handling tool is proximate the wear part, operating the handling tool having gripping arms having a plurality of gripping pads and gripping elements and a biased tab, such that the plurality of gripping pads and gripping elements grip the wear part and the tab is positioned before or after a rear of the wear part. The tab includes an resilient member that is compressed by retraction of the tab against a side of the wear part, and expanded when the handling tool is maneuvered such that the tab is positioned to engage a hole or the rear of the wear part. The manipulator then pulls the handling tool with the wear part to remove the wear part from the base.

The above-noted aspects, embodiments and examples can be used independently or collectively with two or more of them together. To gain an improved understanding of the advantages and features of the aspects of the invention, reference may be made to the following descriptive matter

BRIEF DESCRIPTION OF THE DRAWINGS

FIG. 3 is a perspective view of a lip of an excavator hoe bucket.

FIG. 4 is a perspective view of a tooth assembly.

FIG. 14A is a top view of the gripping system of the handling tool of FIG. 7 on approach to supporting a wear part.

FIG. 14B is a magnified cross sectional view of the tab assembly in a loaded position.

FIG. 15A is a top view of the gripping system of the handling tool of FIG. 7 supporting a wear part.

FIG. 16A is a top view of the gripping system of the handling tool of FIG. 7 supporting a second wear part.

DETAILED DESCRIPTION OF THE INVENTION

The present disclosure pertains to a handling system for handling ground-engaging wear parts used on earth working equipment, and to processes for removing and/or installing such wear parts, and/or other handling of the wear parts. The handling system provides advantages in speed, ease, and/or safety in the handling of the wear parts. The system can be used to install and/or remove a wide variety of ground-engaging wear parts on and/or from many kinds of earth working equipment including, for example, dozers, loaders, dragline machines, cable shovels, face shovels, hydraulic excavators, dredge cutters, buckets, lips, blades, rippers, shear drums, continuous miners, etc. Examples of such ground-engaging products include points, adapters, intermediate adapters, shrouds, runners, picks, wear plate, etc. Earth working equipment as used herein can at times refer to various excavating or other earthmoving machines, the ground-engaging components of the machines such as buckets, cutter heads, shearer drums, etc., or both the machines and components in combination.

Relative terms such as front, rear, top, bottom and the like are used for convenience of discussion. The terms front or forward are generally used to indicate the usual direction of travel during use (e.g., while digging), and upper or top are generally used as a reference to the surface over which the material passes when, for example, it is gathered into the bucket. Nevertheless, it is recognized that in the operation of various earth working machines the wear assemblies may be oriented in various ways and move in all kinds of directions during use.

Figure 1:
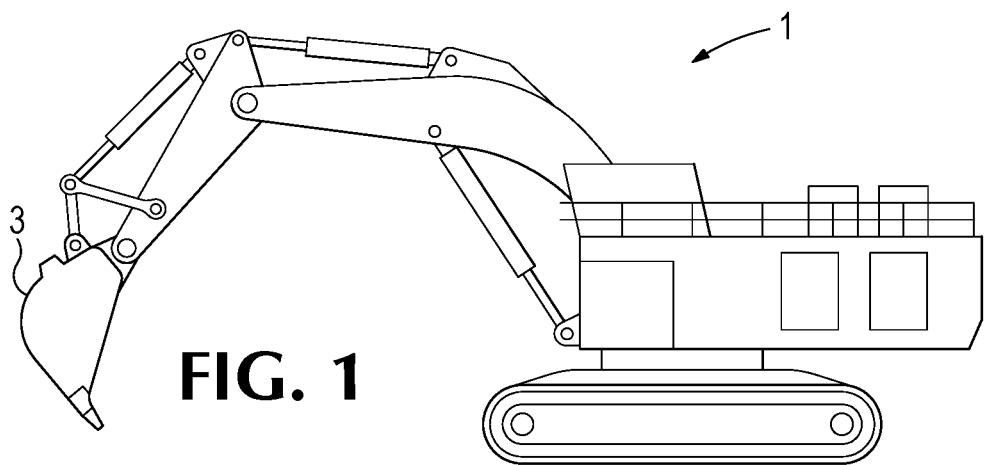
FIG. 1 is a side view of a mining excavator.
Figure 2:
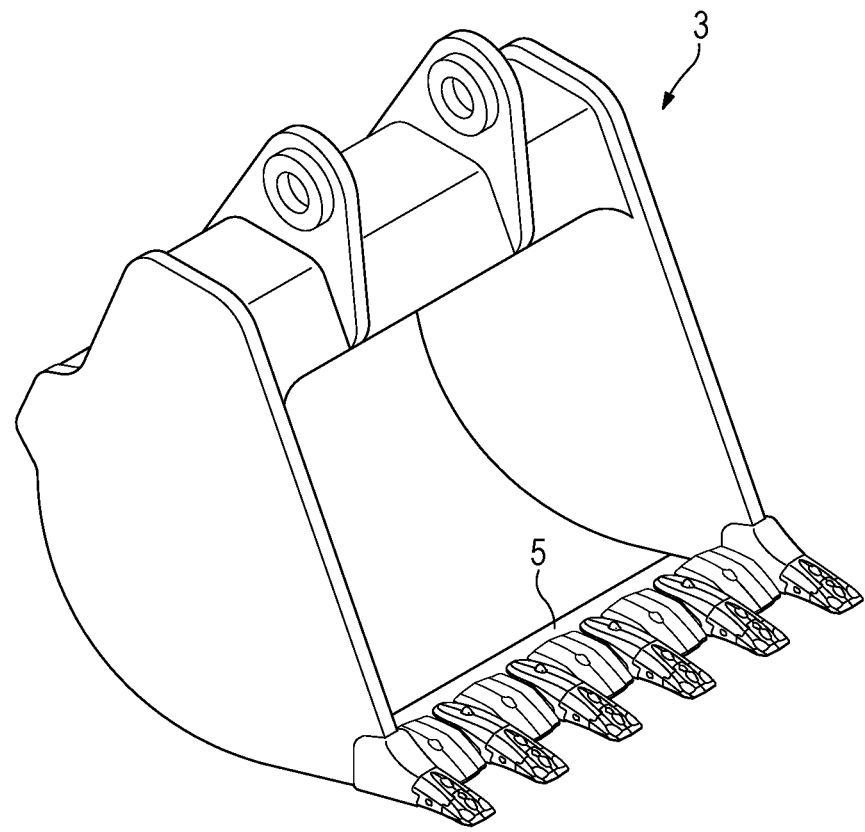
FIG. 2 is a perspective view of an excavator hoe bucket.
Figure 5:
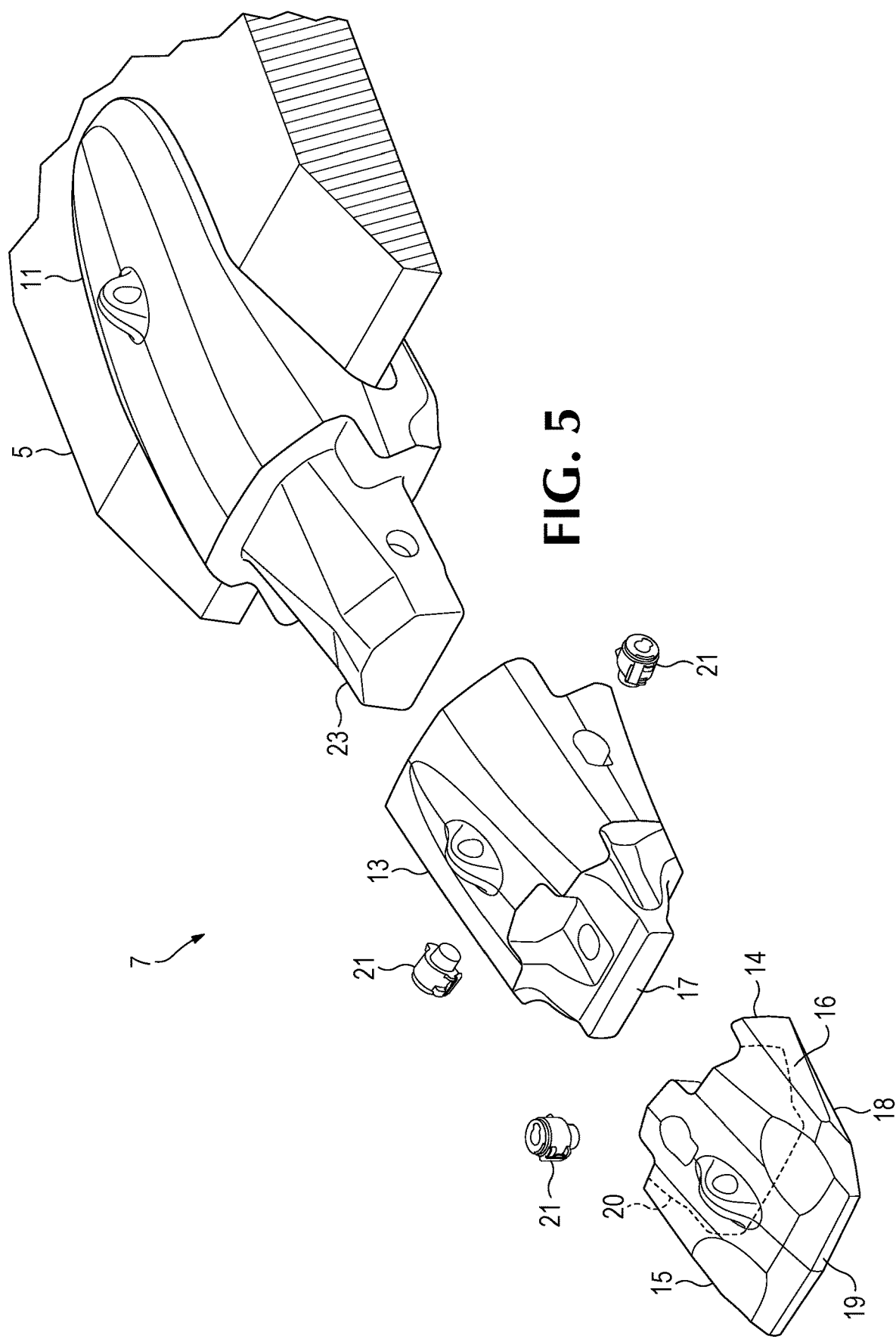
FIG. 5 is an exploded perspective view of the tooth assembly shown in FIG. 4.

An earth working equipment such as mining excavator 1 is equipped with a bucket 3 for gathering earthen material during digging (FIG. 1). The bucket 3 has a lip 5 that defines at least part of the digging edge of the bucket 3 (FIGS. 2 and 3). The digging edge is that portion of the equipment that leads the contact with the ground. Wear parts such as teeth and shrouds are often secured to the digging edge to protect the edge and break up the ground ahead of the lip. Multiple teeth 7 and shrouds 9, such as disclosed in U.S. Pat. No. 9,222,243, which is incorporated herein by reference, may be attached to lip 5 of bucket 3 (FIGS. 4 and 5). The illustrated tooth 7 includes an adapter 11 welded (or otherwise secured) to lip 5, an intermediate adapter 13 mounted on adapter 11, and a point (also called a tip) 15 mounted on base 13. While one tooth construction 7 is shown, other tooth arrangements are possible. Point 15 includes a rear surface 14 with a rearwardly-opening cavity 20 to receive nose 17, opposite sides 16, a bottom surface 18, and a front end 19 to penetrate the ground. A securement mechanism, typically called a retainer, pin or lock 21, is used to secure wear part 15 to base 13, and base 13 to nose 23 (FIGS. 2 and 3), though different locks could be used to secure point 15 and base 13. In this application, point 15 is typically referred to as the wear part and intermediate adapter 13 as the base. Nevertheless, intermediate adapter 13 and adapter 11 are wear parts as well. For example, when intermediate adapter 13 needs replacement, it can be referred to as the wear part and adapter 11 as the base. Similarly, when adapter 11 needs replacement, it can be referred to as the wear part and lip 5 as the base. During the life of the bucket, the wear parts 11, 13, 15 are usually replaced a number of times.

Figure 6:
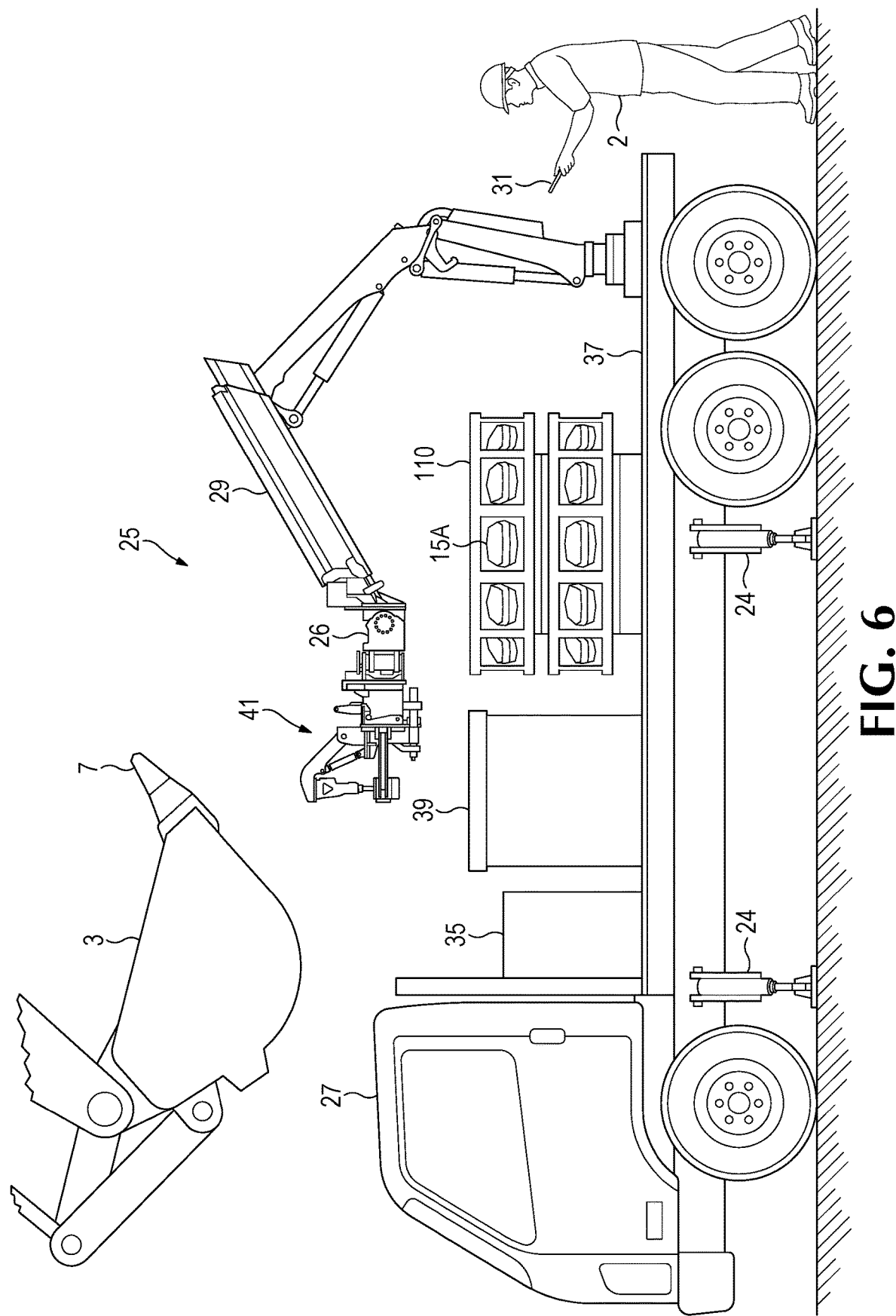
FIG. 6 is a perspective view of a handling system mounted on a truck adjacent a bucket with wear parts.

Referring to FIG. 6, a tool 25 can, e.g., be used to remove and/or install wear parts 15 or otherwise handle the wear parts. The tool 25 is brought to the earth working equipment 1 needing maintenance so that the wear parts may be replaced even when the earth working equipment is in a remote location and the wear parts must be replaced in the field. The tool 25, for example, may include a service vehicle 27 as a mobile base with at least one manipulator 29 and at least one controller 31 such as a Central Processing Unit (CPU) with programmable logic to control the manipulator 29. The controller 31 can be a single CPU or a combination of CPUs located, for example, in the handling tool, the manipulator, the joint, and/or the service vehicle. The controller 31 can be in a remote location or, as described below, tool 25 can be manually operated or partially manually operated. In some examples, the tool 25 includes a joint 26 that connects the manipulator 29 with a handling tool 41.

The joint 26 could be a joint as disclosed in U.S. application 20190360180, filed Mar. 29, 2019, "Manipulator, system, and process of operating the same," the entirety of which is incorporated by reference herein. The handling tool could be coupled to a manipulator in other ways. The handling tool 41 may include connectors 35 to couple the handling tool to the manipulator 29 with or without joint 26.

The service vehicle 27 may also be equipped with outrigger stabilizers 24, a power source, a manipulator platform 37, storage stalls or pallets 39, and auxiliary tools, sub-tools, or handling tools 41 to be used in conjunction with the manipulator 29. The manipulator 29, joint 26, and handling tools 41 may be powered from a number of power sources. For example, the manipulator 29, handling tools 41 and/or other auxiliary tools may be powered via the service vehicle 27, a generator, or batteries. The service vehicle 27 is illustrated as wheeled so that it can easily be moved from one location to another, but other configurations are possible. In an alternative example not shown, the service vehicle may have tracks or may have wheels and tracks. The service vehicle 27 is driven to the mining excavator 1 by an operator located within the service vehicle 27. Alternatively, the service vehicle 27 may be driven to the mining excavator 1 autonomously or remotely via a user input device. For example, the service vehicle 27 may be remotely driven with a joystick (not shown) and cameras (not shown) located on the service vehicle 27. In another alternative, the service vehicle 27 may be fully automated and programmed to drive to the mining excavator 1 needing wear parts 15 replaced.

In one example, the service vehicle 27 is driven close enough to the excavator bucket 3 so that the handling tool 41 is able to reach the wear parts 15 on the bucket 3. In some cases, the excavator operator may need to adjust the bucket 3 so that the bucket 3 is tilted up or prop the bucket 3 on a platform so that the handling tool 41 is able to reach the wear parts 15. From this position the tool 25 is able to remove and/or install wear parts as will be further discussed below.

Figure 7:
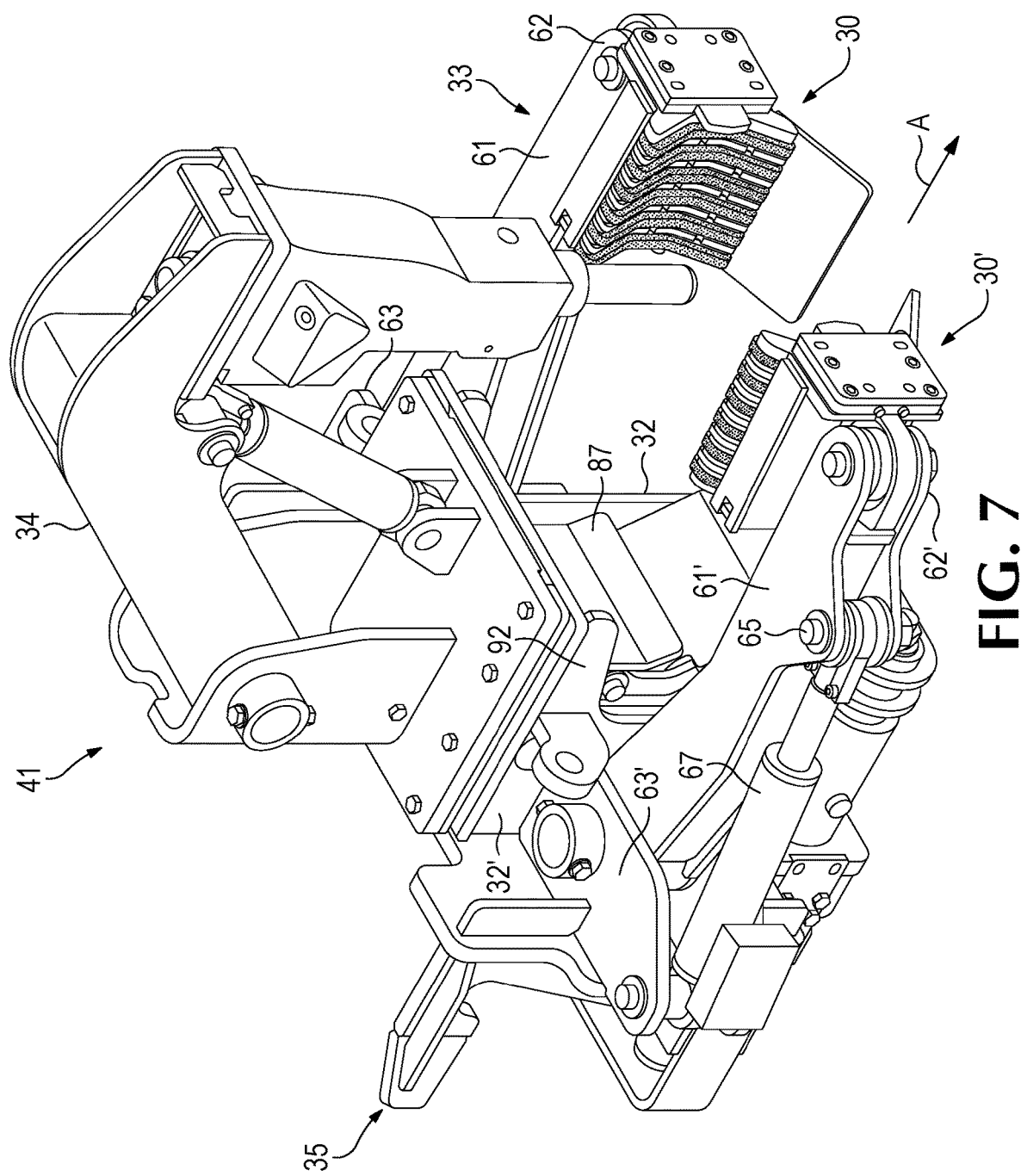
FIG. 7 is a perspective view of a handling tool with a gripping system.
Figure 8:
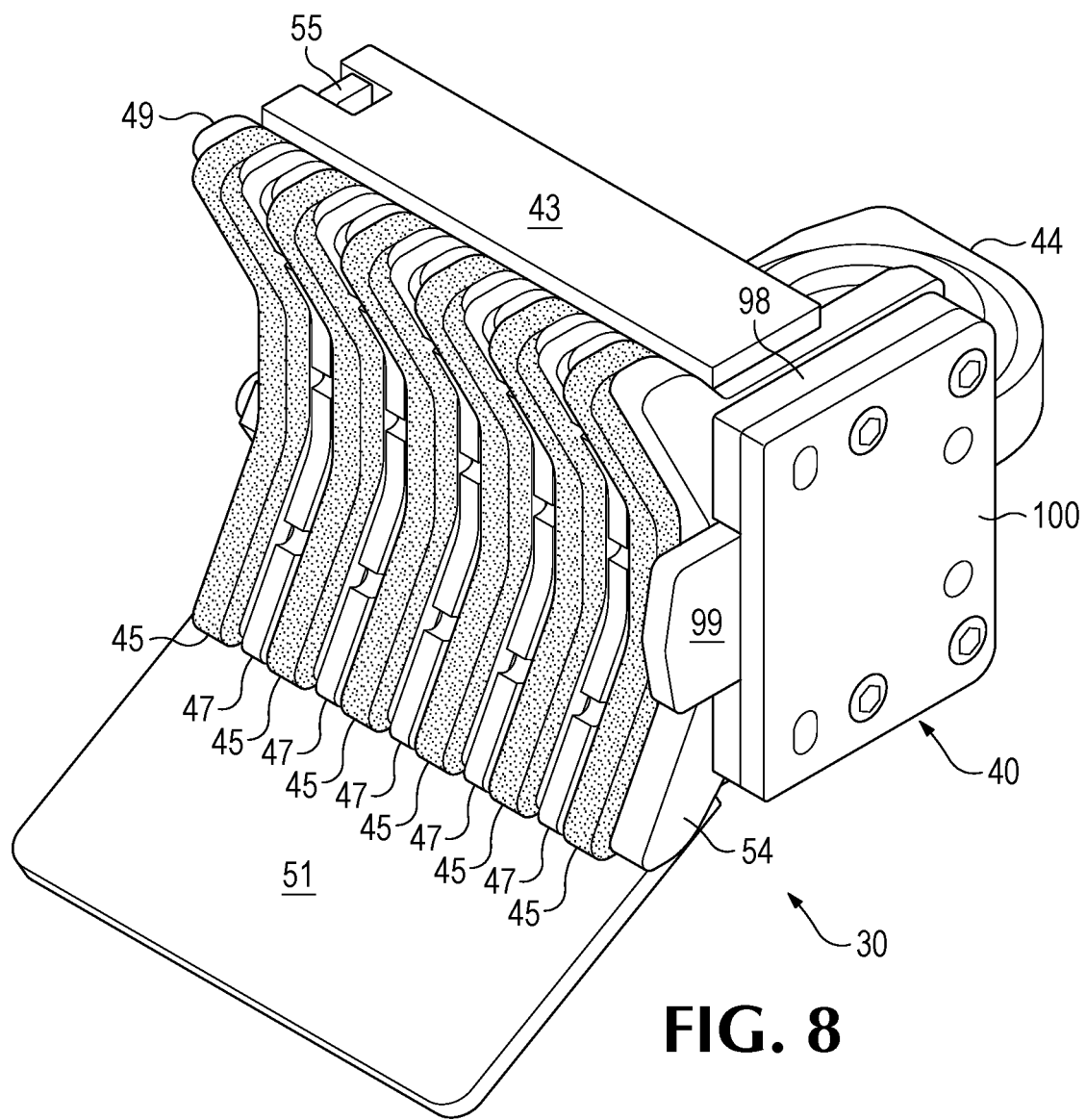
FIG. 8 is a perspective view of a gripping assembly of the gripping system of FIG. 7.
Figure 9:
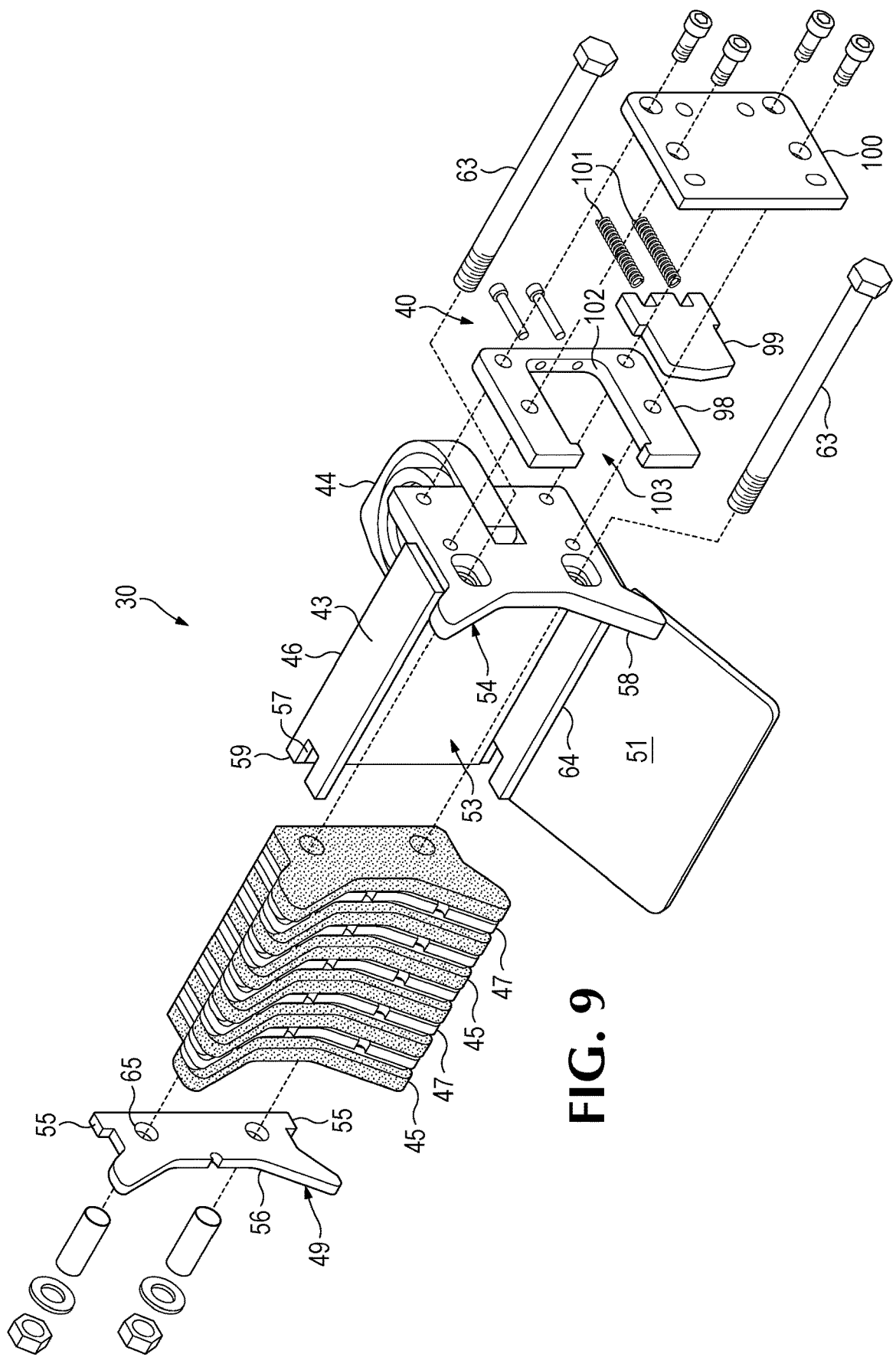
FIG. 9 is an exploded perspective view of the gripping assembly of FIG. 8.

Referring to FIG. 7, in one example, the handling tool 41 includes a gripper system 33 that extends outward or forward from a base structure 32 of the handling tool 41 and an optional impactor 34 located generally above the gripper system 33. The forward direction is used herein as a relative term such that forward generally identifies the direction toward the distal a working end. In connection with the handling tool 41 illustrated in FIG. 7, the forward direction is illustrated by arrow A. Nevertheless, forward may be different directions depending on the context. For example, a forward end of the excavator seen in FIG. 7 would be in the opposite direction to the forward end of the handling tool 41. The gripper system 33 may be used to secure the wear part 15, to keep the wear part 15 from falling, and to mount to and/or disengage the wear part 15 from the earth working equipment 1, e.g. an excavator lip. The gripper system 33 includes two arms 61, 61' each with a gripping assembly 30, 30' located on opposite sides of base structure 32 of the handling tool 41 to oppose one another. The gripping assemblies 30, 30' selectively engage the wear part 15.

In the illustrated example, the pair of opposing arms 61, 61' move laterally (e.g. side to side) in relation to a longitudinal direction A to grip and release the wear part. The arms 61, 61' are each pivotally secured to arm supports 63' to move about pivot pins 65 in response to actuators 67, which in this example are hydraulic cylinders. In an alternative example, one arm may be fixed, and the other arm may be pivotal about a pivot pin. Other kinds of actuators could be used such as electric actuators (e.g., rack and pinion, ball screw, etc.), and the source of electric power could be the excavator, batteries or other means. The tool 25 can include mechanical actuators that are manually operated. In one such example, the manipulator 29 would include an intelligent assist device (IAD), by which an operator 2 could easily manually manipulate the tool head 41 and wear parts gripped for removal and installation from and onto earth working equipment. The kind of movement could also be different. For example, the arms could translate toward and away from each other along a linear path instead of pivoting.

Each gripper assembly 30, 30' may contact and hold the wear part 15 on at least opposing sides 16 of the wear part 15. In the illustrated example, the gripping assemblies contact lateral sides of the wear part but they could instead or also contact upper and lower sides of the wear part. In some examples, the gripper assemblies 30, 30' contact the wear part 15 on the opposing sides 16, a top surface 17, a bottom surface 18, a rear surface 14, and/or a front surface 19. Each gripper assembly 30, 30' is preferably pivotally attached to the free end 62, 62' of the respective arm 61, 61'. In the illustrated example, gripper assemblies 30, 30' are connected to the arms 61, 61' by connectors 44.

The gripping system 33 may include an optional support or thrust plate 87 that may complement at least in part the shape of the front end 19 of the wear part. In one example, the support 87 is connected to support actuator 89 that can move the plate forward and back in relation to base structure 32. That is, the support 87 may be moved forward to engage a front portion (e.g. front 19 of the tip) of the wear part. This provides positive retention of the wear part 15 between gripping assemblies 30, 30' and the support 87 supporting the front of the tip 19. Alternatively, the arms 61, 61' could themselves be forward and rearwardly adjustable and the support fixed to the base structure 32. One or more supports could also be provided on the rear end of one or more of the gripping assemblies. Other arrangements to hold wear part 15 could be used. In an alternative example, a support is not used and the arms 61, 61' fully support the wear part 15.

Referring to FIGS. 8-13, the gripping assembly 30 shown includes a resiliently-biased tab assembly 40, a gripper housing 43, a plurality of gripping pads 45, a plurality of gripping elements 47, an end plate 49, rods 63, and a bottom wing plate 51. The gripping assembly 30' is substantially similar; i.e., it is the mirror image of gripping assembly 30' and will not be separately described herein. Each gripping assembly has a distal or front end and a proximate or rear end, wherein the proximate end is closer the base structure 32 and the distal end is closer to the earth working equipment 3. Handling tool 41 could alternatively include one or more than two tab assemblies 41, the at least one tab assembly could be provided on the gripping assembly other than adjacent its distal end, and/or at least one tab assembly could be secured to the handling tool separately from the gripping assembly (e.g., on an arm 61, 61'). The illustrated embodiment is intended as an example structure. Other constructions are possible.

The gripper housing 43 is shown with a substantially rectangular cuboid shape, though other shapes are also possible. The gripper housing 43 includes an opening 53, a front plate 54 that is similarly sized to the tab assembly 40, and an opposite end plate 49. A plurality of gripping pads 45 and gripping elements 47 are located in opening 53 between sides 54, 56 to collective define a gripping member 48 to contact and hold the wear part. The gripper housing 43 may include a connection 44 secured to an outer surface 46 of the gripper housing 43. The connection 44 connects to the free end of the respective arm 61. The connection 44 may including bearings, which could allow for axial sliding, radial rotation and/or swiveling motion. This rotating connection may also aid in the capture of the rear of the wear member. Other connections are possible.

In the illustrated example, the end plate 49 defines the rear most side surface of the gripper housing 43, but other configurations are possible. The end plate 49 is substantially rectangularly shaped with a gripping portion 56 that generally aligns with the gripping portion 58 of the front plate 54, the gripping pads 45 and the gripping elements 47, but other shapes are possible. The end plate 49 may further include tabs 55 for receiving within similarly shaped recesses 57 on the rearward end 59 of the gripper housing 43. The end plate 49 may further include a retaining aperture 65 for a rod 63 or other retaining structure to pass therethrough. The plurality of gripping pads 45 and gripping elements 47 are situated in the gripper housing 43. They may be arranged with an alternating pattern between gripping elements 47 and gripping pads 45. Other arrangements are possible. The combination of materials (e.g. elastomer and metal) allows for a variety of different shaped wear parts 15 to be gripped for installation and removal. The gripping pads 45 can conform to the shape of the wear part 15 and the gripping elements 47 can provide a hard resistance to accompany the gripping force of the gripping system 33. Other gripping arrangements are possible.

The bottom wing plate 51 can be attached to a bottom 64 of the gripper housing 43. A bracket may connect to the bottom of the gripper housing 43 and may secure the wing plate 51 to the gripper housing 43. The wing plate 51 can be inclined at an angle of about 35-55 degrees (though other angles are possible). The wing plate 51 does not necessarily engage the wear part 15 during attachment, so in those instances where it does not, it acts as a safety net to catch the wear part 15 that may become dislodged during handling. The bottom wing plate 51 is situated below the wear part contacting portions of the gripping pad 45 and gripping elements 47 and adjacent the bottom of the gripper housing 43, but other configurations are possible. Wing plate 51 may also be omitted.

Figure 10:
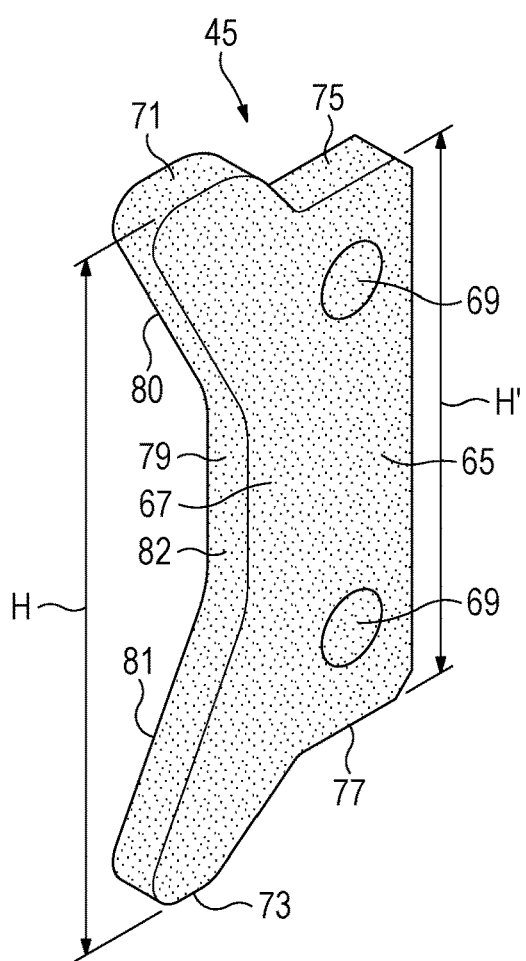
FIG. 10 is a perspective view of a gripping pad of the gripping assembly of FIG. 8.

Referring to FIG. 10, an example gripping pad 45 is shown. The gripping pad 45 includes a mounting portion 65 and an engagement or working portion 67. The gripping pad 45 is preferably made from an resilient type material (e.g. rubber, elastomer, a naturally occurring polymer of isoprene, a neoprene, a synthetic polymer of 2-chloro-1,3-butadiene, or the like). In one example, a Durometer shore hardness scale of 40 type rubber is used, but other examples of harder and softer material may also be used. The gripping pad 45 may be made of multiple materials, but at least a portion of the pad 45 is preferably able to deform at least partially, but this is not essential.

In the illustrated example, the mounting portion 65 has a substantially rectangular cuboid shaped and is situated outward of the engagement portion 67. The mounting portion 65 may include an aperture 69 for situating rod 63 therethrough or another form or retaining means, but other configurations are possible. The engagement portion 67 of the gripping pad 45 is preferably concave or crescent shaped with surfaces 71, 73 extending outward from the ends 75, 77 of the mounting portion 65. In the illustrated example, the height H of the engagement portion 67 is larger than the height H' of the mounting portion 65, but other configurations are possible. An engagement surface 79 connects the surfaces 71, 73 and is preferably arcuate or concave end to end to cradle the wear part. Other examples are possible. It may be that each gripping pad 45 has its own curvature that is different from one or more of the other gripping pads; e.g. some may have smaller radius arc portions to account for the anticipated shapes of worn wear parts. The engagement surface 79 may be formed of linear segments and/or be curved. The curvatures can optionally be in any of a double radiused, a logarithmic, an exponential, a golden ratio, or the like curve. In the illustrated example, the engagement surface 79 is made up of three surfaces with two surfaces 80, 81 extending outward and a linear surface 82 connecting them.

Figure 11:
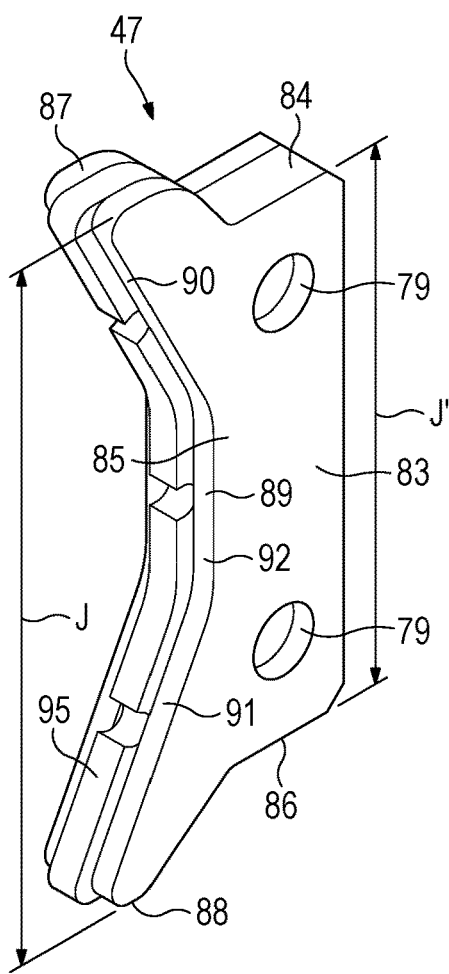
FIG. 11 is a perspective view of a gripping element of the gripping assembly of FIG. 8.

Referring to FIG. 11, an example gripping element 47 is shown. The gripping element 47 is preferably similarly shaped to the gripping pad 45. The gripping element 47 includes a mounting portion 83 and an engagement or working portion 85. The gripping element 47 is preferably made from an hard material such as metal (e.g. steel, tungsten, chromium, titanium, and the combinations of the like). The gripping element 47 may be made of multiple materials, but the working portion 85 is preferably not easily deformed, though this is not essential. The mounting portion 83 has a substantially rectangular cuboid shaped and is situated outward of the engagement portion 85. The mounting portion 83 includes an aperture 79 for situating rod 63 therethrough or another form or retaining means. The engagement portion 85 of the gripping element 47 is preferably concave or crescent shaped with surfaces 87, 88 extending outward from the ends 84, 86 of the mounting portion 65. In the illustrated example, the height J of the engagement portion 67 is larger than the height J' of the mounting portion 65, but other configurations are possible.

An engagement surface 89 connects the surfaces 87, 88 and is preferably arcuate or concave end to end. Other examples are possible. It may be that each gripping element 47 has its own curvature that is different from one or more of the other gripping elements; e.g. some may have smaller radius arc portions to account for the anticipated shapes of worn wear parts. The engagement surface 85 may be formed of linear segments and/or be curved. The curvatures can optionally be in any of a double radiused, a logarithmic, an exponential, a golden ratio, or the like curve. In the illustrated example, the engagement surface 89 is made up of three surfaces with two surfaces 90, 91 extending and diverging outward and a linear surface 92 connecting them, but other configurations are possible.

Figure 12:
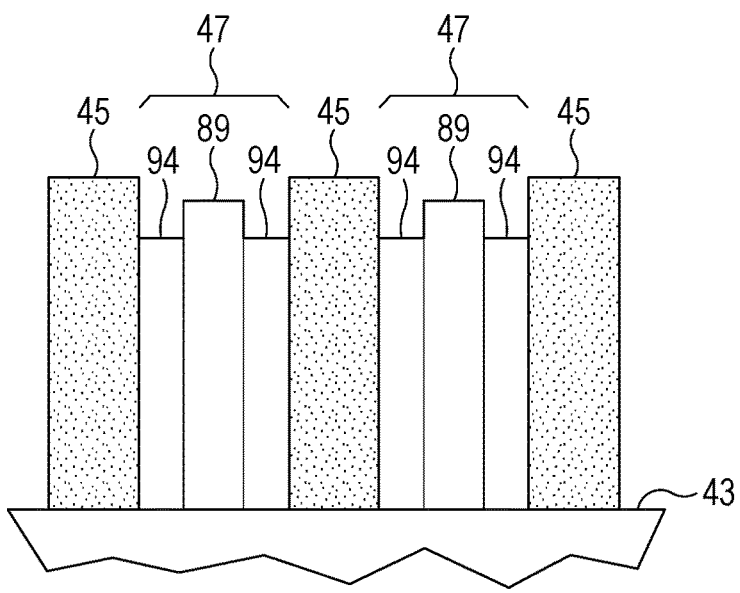
FIG. 12 is magnified top view of a plurality of gripping pads and gripping elements of the gripping assembly of FIG. 8.

An optional ridge 95 may be located on one or more of surfaces 90, 91, 92 and extend lengthwise further inward from the inner surfaces of the engagement portion 67. In this illustrated example, the ridge 95 may engage the wear part in lieu of the inner surfaces 90, 91, 92. The ridge 95 may be located centrally or edge-wise depending upon the location of the gripping element 47 with the plurality of gripping elements 47. In this example, all the gripping elements 47 have a central ridge 95, but other configurations are possible. The inward extension (i.e., toward the wear part) of the gripping elements 47 may be less than the inward extension of the gripping pads 45 (FIG. 12). In this example, the ridge 95 may act as a stop surface to the wear part 15 when the gripping pad 45 that is situated in a valley 94 located between two ridges 95 deforms. The gripping element 47 provides the following advantages: 1) a controlled area or volume for the controlled squish/displacement of the gripping pad 45, and 2) the taller ridges 95 limit the depth of gripping pad 45 deformation and/or 3) the ridges 95 provide some gripping action as well once the gripping pad 45 has deformed. If the ridges are omitted, the inner surfaces 90-92 perform these functions. Alternatively, the gripping elements 47 provide support in the gripping of wear part 15 but some or all may not contact the wear part directly when the wear part is gripped by the gripping assemblies 30.

An optional resiliently-biased tab assembly 40 is attached to each gripping assembly to engage the wear part. The tab assembly 40 is preferably secured to the front side 54 of the gripper housing 43 The attachment could be effected by fasteners, bolts, epoxy, welding, or the like. The tab assembly 40 may also be a part of the gripper housing 43. The tab assembly 40 may be attached to the connection 44 on the free end of the respective arm 61, 61', but other configurations are possible. As described below, the tab assembly 40 can improve the gripping of the wear part.

Figure 13A:
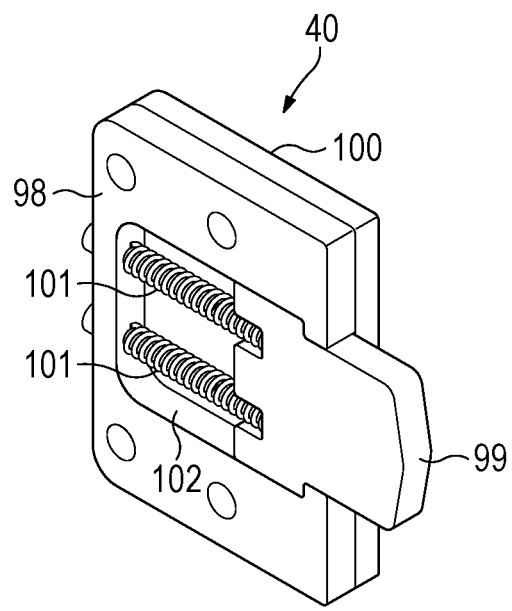
FIG. 13A is a perspective view of a tab assembly of the gripping assembly of FIG. 8 in an unloaded position with portions broke away.

Referring to FIG. 13A, in one example, the tab assembly 40 includes a tab housing 98, a tab 99, a cover 100, and one or more resilient members 101. The tab housing 88 and the cover are cuboid shaped, though other shapes are also possible. The cover 100 is substantially similar to the tab housing 98, with the exception that the tab housing 98 includes a passthrough opening 102 with a sideward or inwardly opening aperture 103 that opens longitudinally and may be sized differently than the opening 102.

The tab 99 and the resilient member 101 are positioned into the opening 102 to extend out the opening 103 in an inward direction (i.e., toward the wear part and/or the opposing gripping assembly). The tab 99 may include an aperture for the resilient member 101 to be positioned in on one end of the tab 99. In other examples, the resilient member 101 may be attached on one end of the tab 99. The tab 99 may be rectangularly shaped, but other shapes are possible. The tab 99 may include outer surfaces that may converge on the end opposite the resilient member 101. The tab housing 98 is positioned such that the opening 102 is covered by the cover 100 of the gripper housing 43. The resilient member 101 is illustrated as a spring situated about a bolt, but other resilient members could be used, e.g. a rubber element, an elastomer, or a naturally occurring polymer of isoprene, a neoprene, a synthetic polymer of 2-chloro-1,3-butadiene, and the like. The recess 102 is sized and shaped such that the resilient member 91 can compress when the tab 99 engages a wear part 15. The uncompressed state or less compressed state of the resilient member 101, allows the tab 89 to be in a steady state of outward bias of the tab housing 98.

Figure 13B:
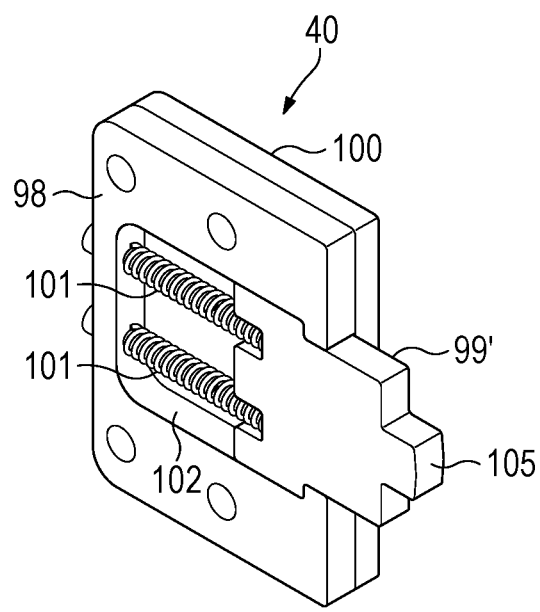
FIG. 13B is a perspective view of a second tab assembly for the gripping assembly of FIG. 8.
Figure 15B:
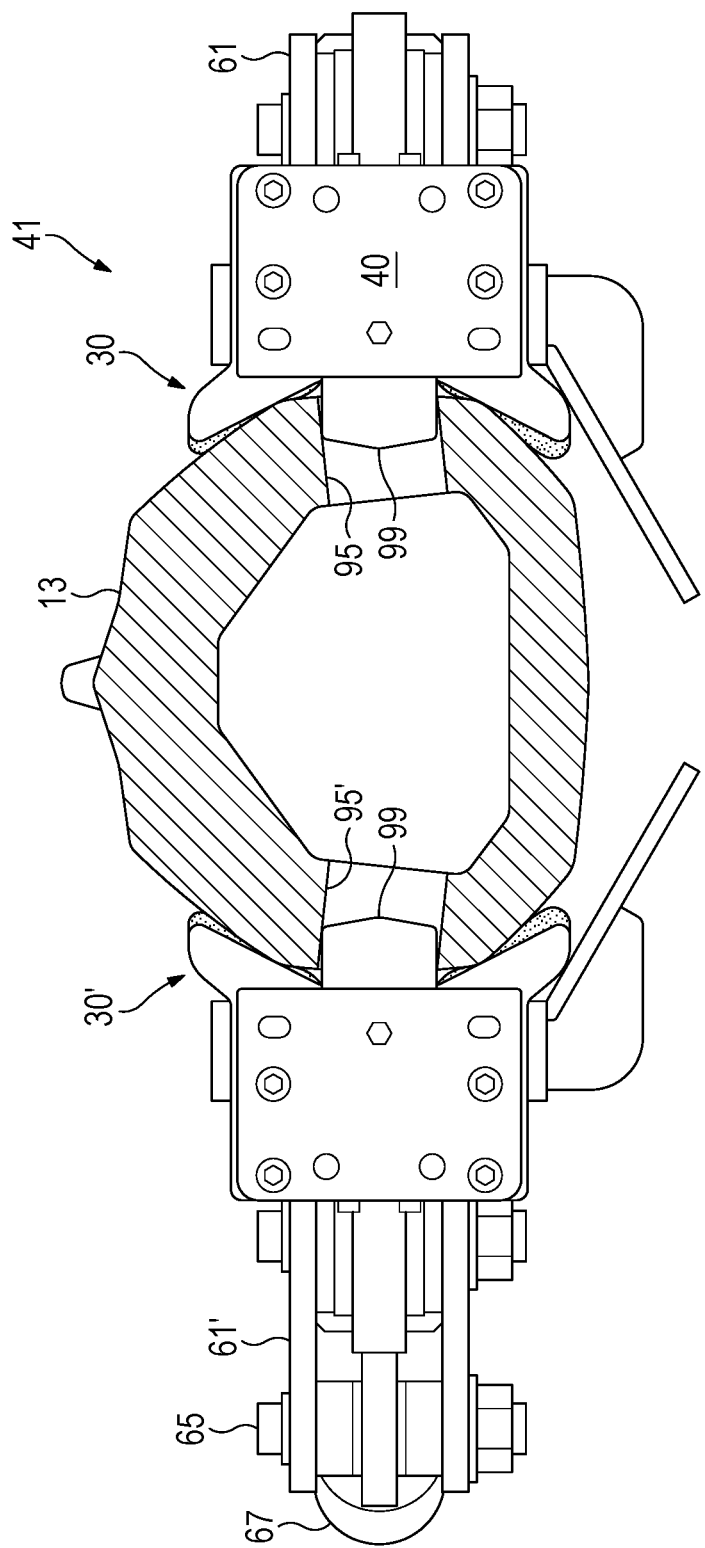
FIG. 15B is a cross section of the gripping system of the handling tool of FIG. 7 supporting a wear part.
Figures 15C, 15D:
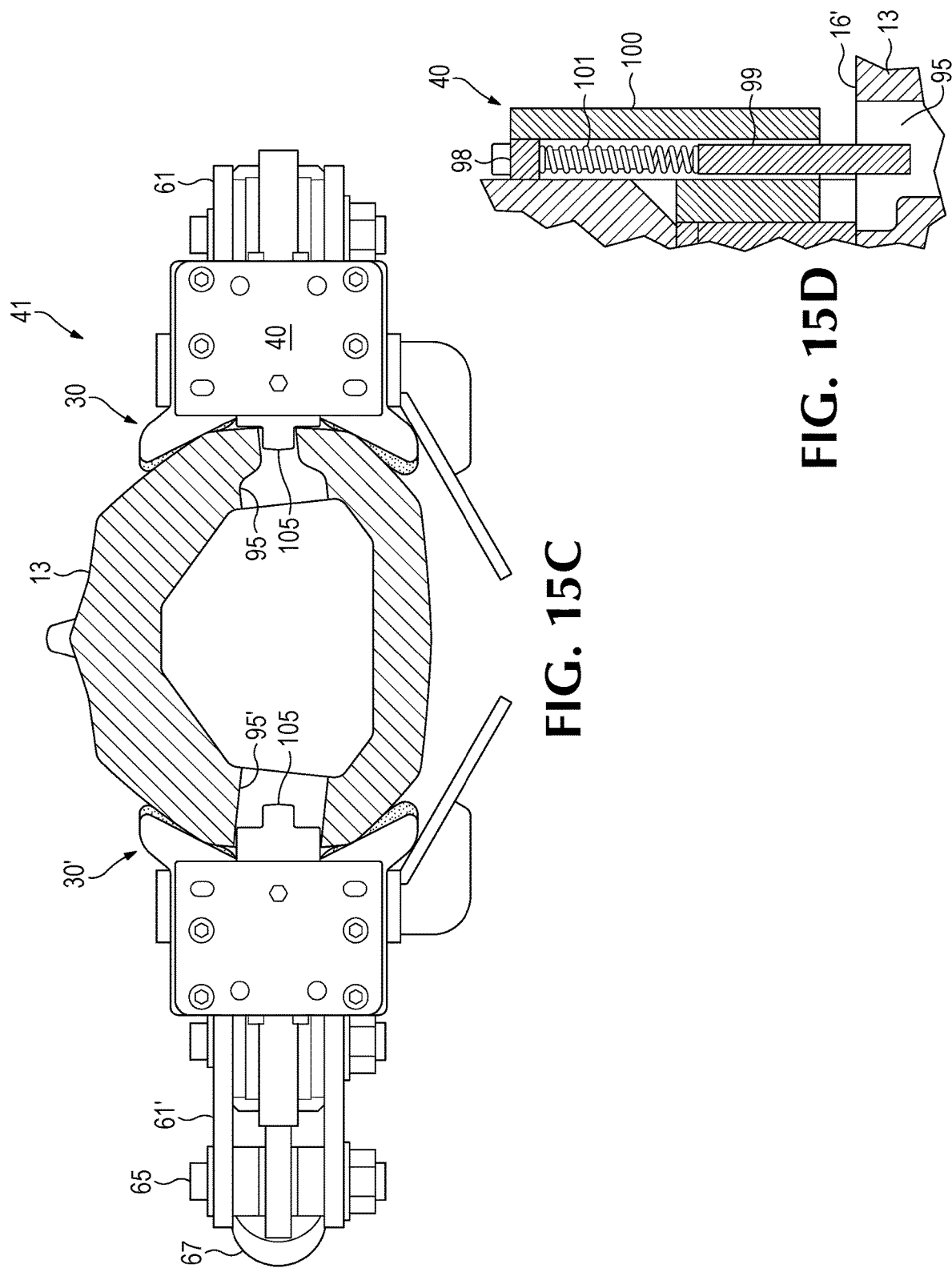
FIG. 15C is a cross section of the gripping system of the handling tool of FIG. 7 supporting another wear part.
FIG. 15D is a magnified cross section of the tab assembly in an unloaded position and captured within a recess of the wear part.
Figures 16B, 16C:
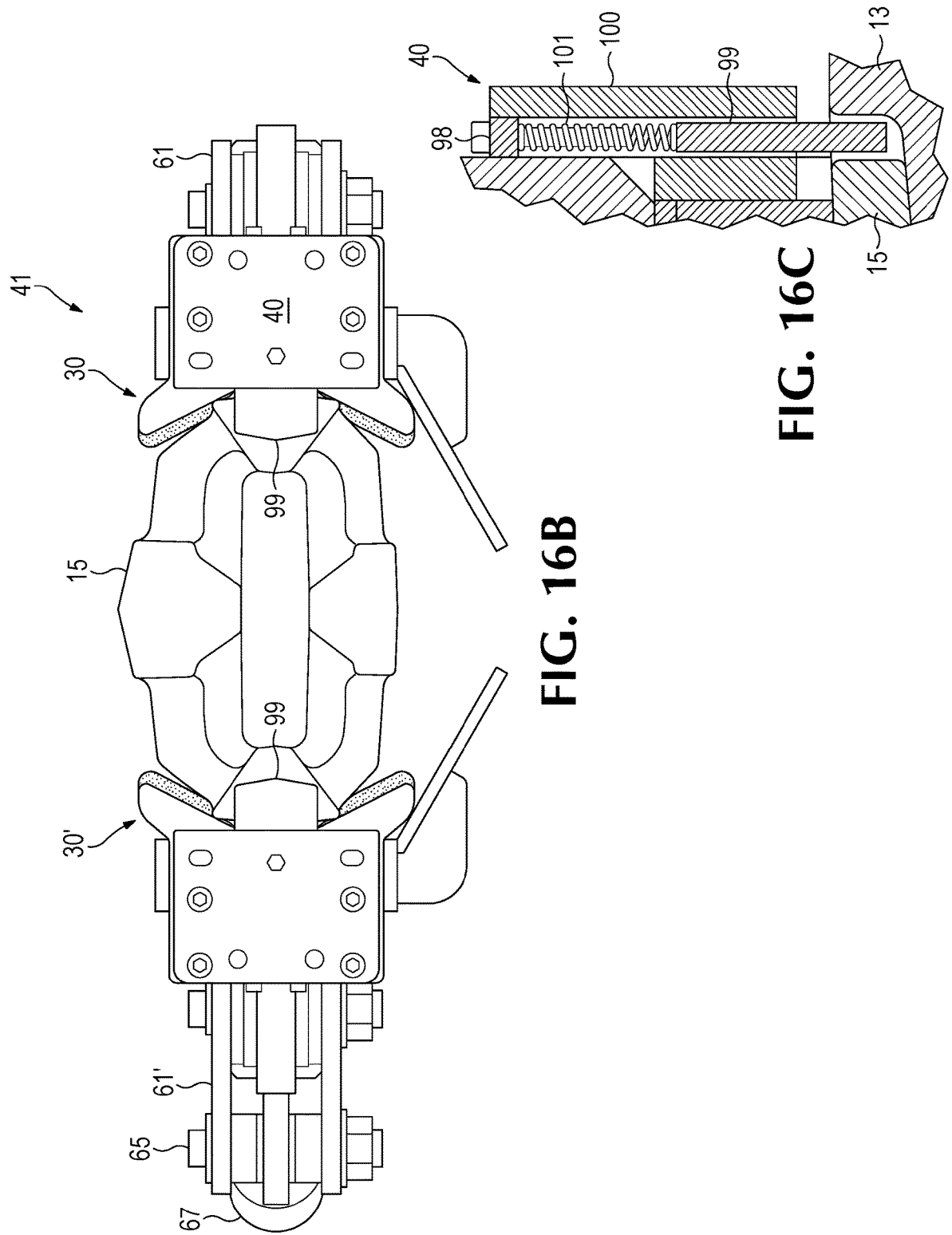
FIG. 16B is a rear view of the gripping system of the handling tool of FIG. 7 supporting a wear part.
FIG. 16C is a magnified cross section of the tab assembly in an unloaded position and engaging a rear surface of the second wear part.

Referring to FIG. 13B, in another example, the tab assembly 40 is substantially similar to the tab assembly 40 as described above with the exception of the tab 99'. The tab 99' is substantially the same as the tab 99 described above with the exception that the tab 99' further includes a projection 105 that extends inward toward the wear member to be handled. The projection 105 may be beneficial for wear members that do not have similarly shaped holes on both sides of the wear member (FIG. 16C).

Referring to FIGS. 14A and 14B, one example of a process to attach the tool 25 to a wear part 13 (such as for removal of the wear part 13) is illustrated. The process begins with the supporting equipment such as truck 27 and/or the manipulator 29 being operated to position the handling tool 41 proximate the worn wear part 13. The outer arms 61,61' are adjusted so the gripping assemblies 30, 30' engage with at least the sides 16' of the wear part 13 forward of holes 95, 95' (i.e., closer to the nose 17 of wear part 13) on the opposite sides 16'. The gripping assemblies 30, 30' may be placed outward of the wear part in an expanded position and moved inward to engage the sides of the wear part or they may be adjusted to approximate the width of the wear part and moved forward (i.e., along direction A) to engage the sides of the wear part. In another example, the plurality of gripping pads 45 may engage with the sides 16', a lateral top surface, and/or a lateral bottom surface of the wear part 13 forward of the hole 95, 95". Other ways of gripping the wear part are possible. For example, if no tab is provided, the gripping assemblies could simply close and grip the wear part.

The holes 95, 95' may be for receiving the lock and tabs 99 (see, e.g., FIG. 5), or they may be provided to simply receive tabs 99 (e.g., holes 95, 95' may be offset from the lock-receiving holes), and/or they may be provided for other reasons. When using tab-receiving holes separate from the lock-receiving holes, the wear part may be gripped with gripping assemblies 30, 30' and/or tabs 99 in holes 95, 95' before releasing or removing the lock(s). Regardless of whether holes 95, 95' receive locks, tool 25 can include auxiliary tools (not shown) to remove or release the locks or the locks can be removed or released by an operator while the handling tool 41 holds the wear part. In some cases, the wear part is gripped with enough inward gripping force so that the gripping elements 47 engage the wear part in addition to the gripping pads or the gripping elements are positioned to grip the wear part with or without the gripping pads. With the gripping assemblies 30, 30' contacting the wear part, the tab 99 can engage and be retracted by the wear part 13 in such a manner as to compress the resilient member 101, such that the tab 99 is loaded with potential energy (FIG. 14C).

Referring to FIGS. 15A, 15B, 15C, and 15D, in the illustrated example, from the point of engagement, the handling tool 41, the handling tool 41 moves forward in the longitudinal direction A so that the tabs 99 approach and fit into the holes 95, 95'. In another example, the gripping pads 45 could be extended further forward to engage the wear part 13 rearward of the holes 95, 95' (i.e., farther from nose 17) and then moved rearward (i.e., toward base structure 32) to capture the tab 89 in the hole 95, 95'. That is, when the tab 99 aligns with the respective hole 95, 95', resilient member 101 urges the tab inward (i.e., toward the wear part) so the tab is received in the hole 95, 95'. Regardless of which way the gripping assemblies 30, 30' are moved along the wear part 13, the tabs 99 set adjacent rear-facing surfaces 96 in the holes 95, 95' to aid in the pulling of the wear part 13 from earth working equipment 3. If holes 95, 95' also receive the locks, a clearance space (not shown) in arms 61, 61' could be provided to remove or release the locks or the locks could be removed after initially gripped by the handling tool 41. Optionally, a sensor could be provided to indicate when the tabs are received in the holes (or behind the rear surface as described below) of the wear part to be gripped.

Using a resiliently-biased tab 99, eases the process of gripping of the wear part as compared to having a fixed tab on the gripping assemblies. Additionally, in some lip assemblies, adjacent teeth and/or shrouds are in close proximity to each other and having a biased tab (as opposed to a fixed tab) can make the gripping process easier. Nevertheless, a fixed tab or no tab could be used. Additionally, the gripping assemblies can grip the wear part by moving toward each other without the above-described process of sliding the tab forward or rearward to fit in a hole or in a gap adjacent the rear surface of the wear part. The gripping force applied by the gripping assemblies 30, 30' may be increased after the tab is against the desired surface.

Referring to FIGS. 16A, 16B, and 16C, a different type of wear part, e.g. a tip 15 is shown that does not include a hole along its sides for receiving tabs 99. In this example, the process to attach to the wear part 15 begins the same as described above with the handling tool 41 approaching the wear part 15 and moving the outer arms 61,61' to contact the wear part 15. The plurality of gripping pads 45 may engage with at least the sides 16 of the wear part 15 forward of the rear 14 of the wear part 15. In another example, the plurality of gripping pads 45 may engage with at least the sides, a lateral top surface, and/or a lateral bottom surface of the wear part 15 forward of rear surface 14. In some cases, with enough inward force, the plurality of gripping elements 47 will engage the wear part 15 in addition to the gripping pads. The tab 99 may engage the wear part 15 in such a manner as to compress the resilient member 101, such that the tab 99 is loaded with potential energy. From the point of engagement, the handling tool 41 may move forward (i.e., in the longitudinal direction A) to approach the rear 14 of the wear part 15. In another example, the gripping pads 45 could engage the wear part 15 with the tabs 99 rearward of the rear 14 of the wear part 15 (e.g. with tabs 99 on the base 13) and then moved rearward (i.e., toward base structure 32) to set the tab 99 against the rear or rear-facing surface 14 of the wear part 15, e.g. in a gap G that separates the wear part 15 from the base. In either case, the handling tool 41 moves forward or rearward longitudinally until the tab 99 catches onto the rear surface of the wear part (FIG. 16B) or other rear-facing surface that may not be at the rear of the wear part. From this point, the wear part 15 can be removed from the base 13 by pulling the wear part 15 rearward (i.e., toward base structure 32). The engagement of the wear part by gripping members 48 against the sides of the wear part and/or by tabs 99 against rear-facing surfaces such as 14 or 96 enable the tool 25 to pull the wear part from the base the wear part is mounted on. The pulling may be achieved by actuation of the manipulator 29 and/or of actuators (not shown) on the handling tool 41.

In some examples, the process may further include the handling tool 41 sliding each tab 99 towards the rear surface 14 until the tabs 99 abut the rear 14 of the wear part 15 (FIG. 14B). This may happen organically in a removal process described below. In other examples, the support 87 may extend forward, such that the support 87 engages a front 19 of the wear part 15. Wear part 15 is now secured and ready for the securement mechanism 21 to be removed or installed from the wear part 15. If the securement mechanism 21 is already removed, the wear part 15 is ready for removal.

In a process to dispose of a worn wear part 15, the manipulator 29 supporting handling tool 41 is then retracted such that the wear part separates from the base it is mounted on. Once the wear part is removed, the manipulator 29 moves handling tool 41 with the worn wear part 15 to place the worn wear part 15 at a disposal site such as a bin, truck bed, pallet, the ground or other location 39 for disposal of the worn wear part. The arms 60, 61 separate to release the worn wear part, e.g., into the bin 39.

In some examples, new wear parts 15A are stored on a shelf in rack 110 but other arrangements are possible. The manipulator 29 can attach to the wear part 15A as described above and pull the new wear part 15A from rack to move it to a position in front of the base where the new wear part 15A will be installed. The wear part 15A is then moved so the cavity in the wear part 15A receives the base; in this example, the nose 17 of the adapter 13 is received into the point 15. The lock 21 can then be moved to secure the wear part to the base by a component of the handling tool, another tool, or separately by the operator.

With the above-disclosed arrangements, the gripper system 33 may be able to grip irregular surfaces so as to attain a single gripper system 33 for a multitude of different points, intermediate adapters, and adapters across various sizing and manufacturers. The plurality of different sizes of the resilient and metal or harder material aid in limiting the depth that the resilient material compresses and allows for a controlled area for engaging non-uniform surfaces. A more versatile gripper system 33 can provide an easier solution than different multiple handling tools specific to a specific size and manufacturer of a wear part (e.g. point, adapter, etc.). This can lead to less machine downtime, increased productivity, and/or reduced cost per tons of material moved. Alternatively, the gripper system 33 can allow for an easy and greater level of engagement with the rear or side aperture of the wear part due to the design of the spring loaded tab. This allows for the tool to effectively grip the wear part for removal or installation because of the straight rearward movement of the tool versus bringing the arms inward from the side of the wear part.

The invention claimed is:

1. A handling tool for handling a ground-engaging wear part for earth working equipment, the handling tool comprising:
 a pair of gripping assemblies spaced apart to receive the wear part therebetween, each of the gripping assemblies including (i) an inner surface to selectively contact and hold the wear part, and (ii) a tab assembly having a resilient member, a tab that is resiliently biased by the resilient member to project inward of the inner surface, the tab being retractable against the resilient bias of the resilient member when in contact with a side of the wear part and extendible inward of the inner surface by the resilient member for contact with a rear-facing surface on the wear part, and a cover, wherein the tab includes a first surface that faces in a first direction to set against the rear-facing surface of the wear part and a second surface that faces in a second direction opposite the first direction to set against the cover, each of the gripping assemblies includes a plurality of resilient gripping pads and a plurality of rigid gripping elements that collectively define the inner surface to contact and hold the wear part, and the gripping elements and the gripping pads are interleaved with each other seriatim in an alternating pattern with one of the gripping pads positioned between adjacent pairs of the gripping elements;
 actuators to move the gripping assemblies toward and away from each other to grip and release the wear part; and
 a base structure supporting the gripping assemblies and the actuators.

2. A handling system for removing a ground-engaging wear part for earth working equipment, the handling system comprising:
 a handling tool including:
  a pair of gripping assemblies spaced apart to receive the wear part therebetween, each of the gripping assemblies including a plurality of resilient gripping pads and a plurality of rigid gripping elements that collectively define an inner surface to contact and hold the wear part, wherein the gripping elements and the gripping pads each having front and rear surfaces and an engagement surface between the respective front and rear surfaces, and are arranged with the rear surfaces of certain one of the gripping pads in abutment with the front surfaces of certain ones of the gripping elements with each of the engagement surfaces facing inward to collectively define the inner surface such that each of the engagement surfaces extend substantially across the inner surface;

actuators to move the gripping assemblies toward and apart from each other to grip and release the wear part; and a base structure supporting the gripping assemblies and the actuators; and a manipulator to support and move the handling tool.

3. A handling system for removing a ground-engaging wear part for earth working equipment, the handling system comprising: a handling tool including: a pair of gripping assemblies spaced apart to receive the wear part therebetween, each of the gripping assemblies including (i) an inner surface having a fixed configuration to contact and hold the wear part, and (ii) a tab assembly having a resilient member, a tab that is separated from the fixed configuration of the inner surface, movable relative to the fixed configuration of the inner surface and resiliently biased by the resilient member to project inward of the inner surface, the tab being retractable against the resilient bias of the resilient member when in contact with a side of the wear part and extendible inward of the inner surface by the resilient member for contact with a rear-facing surface on the wear part, and a cover, wherein the tab includes a first surface that faces in a first direction to set against the rear-facing surface of the wear part and a second surface that faces in a second direction opposite the first direction to set against the cover; actuators to move the gripping assemblies toward and away from each other to grip and release the wear part; and a base structure supporting the gripping assemblies and the actuators; and a manipulator to support and move the handling tool.

4. A handling tool for handling a ground-engaging wear part for earth working equipment, the handling tool comprising:

a pair of gripping assemblies spaced apart to receive the wear part therebetween, each of the gripping assemblies including (i) an inner surface defined by a plurality of resilient gripping pads and a plurality of rigid gripping elements that collectively define an inner surface having a fixed configuration to contact and hold the wear part and (ii) a tab assembly having a resilient member, a tab that is resiliently biased by the resilient member to project inward of the inner surface, the tab being retractable against the resilient bias of the resilient member when in contact with a side of the wear part and extendible inward of the inner surface by the resilient member for contact with a rear-facing surface on the wear part, and a cover, wherein the tab includes a first surface that faces in a first direction to set against the rear-facing surface of the wear part and a second surface that faces in a second direction opposite the first direction to set against the cover, wherein the gripping elements and the gripping pads each have front and rear surfaces and an engagement surface between the respective front and rear surfaces, and are arranged with the rear surfaces of certain ones of the gipping pads in abutment with the front surfaces of certain ones of the gripping elements with each of the engagement surfaces facing inward to collectively define the inner surface such that each of the engagement surfaces extend substantially across the inner surface;

actuators to move the gripping assemblies toward and away from each other to grip and release the wear part; and a base structure supporting the gripping assemblies and the actuators.

5. The handling tool of claim 4 wherein the gripping elements and the gripping pads are arranged seriatim in an alternating pattern with one of the gripping pads positioned between adjacent pairs of the gripping elements.

6. A handling tool for handling a ground-engaging wear part for earth working equipment, the handling tool comprising:

a pair of gripping assemblies spaced apart to receive the wear part therebetween, each of the gripping assemblies including a plurality of resilient gripping pads and a plurality of rigid gripping elements that collectively define an inner surface to contact and hold the wear part, wherein the gripping elements and the gripping pads each have front and rear surfaces and an engagement surface between the respective front and rear surfaces, and are arranged with the rear surfaces of certain ones of the gipping pads in abutment with the front surfaces of certain ones of the gripping elements with each of the engagement surfaces facing inward to collectively define the inner surface such that each of the engagement surfaces extend substantially across the inner surface;

actuators to move the gripping assemblies toward and away from each other to grip and release the wear part; and a base structure supporting the gripping assemblies and the actuators.

7. The handling tool of claim 6 wherein each of the gripping assemblies includes at least one tab assembly including a tab and a resilient member to resiliently bias the tab inward of the inner surface, the tab being retractable against the bias of the resilient member when in contact with a side of the wear part.

8. The handling tool of claim 6 including a gripper housing that partially encloses the gripping pads and gripping elements.

9. A handling tool for handling a ground-engaging wear part for earth working equipment, the handling tool comprising: a pair of gripping assemblies spaced apart to receive the wear part therebetween, each of the gripping assemblies including (i) an inner surface having a fixed configuration to contact and hold the wear part, and (ii) a tab assembly having a resilient member, a tab that is separated from the fixed configuration of the inner surface, movable relative to the fixed configuration of the inner surface and resiliently biased by the resilient member to project inward of the inner surface, the tab being retractable against the resilient bias of the resilient member when in contact with a side of the wear part and extendible inward of the inner surface by the resilient member for contact with a rear-facing surface on the wear part, and a cover, wherein the tab includes a first surface that faces in a first direction to set against the rear-facing surface of the wear part and a second surface that faces in a second direction opposite the first direction to set against the cover; actuators to move the gripping assemblies toward and away from each other to grip and release the wear part; and a base structure supporting the gripping assemblies and the actuators.

10. The handling tool of claim 9 wherein each of the gripping assemblies includes a proximate end and a distal end where the proximate end is closer to the base structure than the distal end, and the tab is adjacent the distal end.

11. The handling tool of claim 9 wherein each of the gripping assemblies includes:

a proximate end and a distal end where the proximate end is closer to the base structure than the distal end and the tab is adjacent the distal end;

a plurality of resilient gripping pads and a plurality of rigid gripping elements that collectively define the inner surface to contact and hold the wear part; and a housing that partially encloses the gripping pads and gripping elements.

12. The handling tool of claim 9 including connectors to couple the handling tool to a manipulator.

13. The handling tool of claim 9 wherein the cover is part of a housing that encloses the resilient member and part of the tab.

14. The handling tool of claim 9 wherein the tab is retractable in a first linear motion against the resilient bias when in contact with a side of the wear part and extendible in a second linear motion opposite the first linear motion for contact with a rear- facing surface on the wear part;

actuators to move the gripping assemblies toward and apart from each other to grip and release the wear part; and a base structure supporting the gripping assemblies and the actuators.

15. The handling tool of claim 9 wherein each of the gripping assemblies includes a plurality of resilient gripping pads and a plurality of rigid gripping elements that collectively define the inner surface to contact and hold the wear part.

16. The handling tool of claim 15 including a gripper housing that partially encloses the gripping pads and the gripping elements.

* * * * *